(12) United States Patent
Haynold

(10) Patent No.: US 9,955,084 B1
(45) Date of Patent: Apr. 24, 2018

(54) HDR VIDEO CAMERA

(71) Applicant: Oliver Markus Haynold, Evanston, IL (US)

(72) Inventor: Oliver Markus Haynold, Evanston, IL (US)

( * ) Notice: Subject to any disclaimer, the term of this patent is extended or adjusted under 35 U.S.C. 154(b) by 561 days.

(21) Appl. No.: 14/280,605

(22) Filed: May 17, 2014

Related U.S. Application Data

(60) Provisional application No. 61/826,799, filed on May 23, 2013.

(51) Int. Cl.
| | |
|---|---|
| *H04N 5/235* | (2006.01) |
| *G06T 5/50* | (2006.01) |
| *G06T 5/00* | (2006.01) |
| *G06T 7/00* | (2017.01) |
| *G06T 7/30* | (2017.01) |

(52) U.S. Cl.
CPC .......... *H04N 5/2355* (2013.01); *G06T 5/007* (2013.01); *G06T 5/50* (2013.01); *G06T 7/30* (2017.01)

(58) Field of Classification Search
CPC ...... H04N 5/2355; H04N 5/2356; G09G 5/02; G06T 5/50; G06T 5/007; G06T 5/008; G06T 5/009
See application file for complete search history.

(56) References Cited

U.S. PATENT DOCUMENTS

| | | |
|---|---|---|
| 5,247,366 A | 9/1993 | Genossar et al. |
| 5,420,635 A | 5/1995 | Inuiya et al. |
| 5,517,242 A | 5/1996 | Nakano et al. |
| 5,929,908 A | 7/1999 | Ikeda et al. |
| 6,148,149 A | 11/2000 | Kagle |
| 6,204,881 B1 | 3/2001 | Ikeda et al. |
| 6,418,245 B1 | 7/2002 | Udagawa |
| 6,496,226 B2 | 12/2002 | Takahashi et al. |
| 6,593,970 B1 | 7/2003 | Serizawa |
| 6,670,993 B1 | 12/2003 | Yamamoto |
| 6,677,992 B1 | 1/2004 | Matsumoto et al. |
| 6,707,492 B1 | 3/2004 | Itani |
| 6,720,993 B1 | 4/2004 | Hwang |
| 6,894,720 B2 | 5/2005 | Zhang |
| 6,952,234 B2 | 10/2005 | Hatano |
| 6,985,185 B1 | 1/2006 | Crawford et al. |
| 7,061,524 B2 | 7/2006 | Liu |
| 7,106,913 B2 | 9/2006 | Battiato et al. |
| 7,133,069 B2 | 11/2006 | Wallach |

(Continued)

OTHER PUBLICATIONS

Ramsey, S. D., Johnson, J. T., & Hansen, C. (2004). Adaptive temporal tone mapping. In M. H. Hamza (Ed.), Proceedings of the Seventh IASTED International Conference on Computer Graphics and Imaging (pp. 124-128).*

(Continued)

*Primary Examiner* — John Villecco

(57) ABSTRACT

According to some embodiments, a camera captures a plurality of images of substantially the same scene at different exposure levels for each video frame to be captured. These images are then merged or fused and processed using a spatially, and optionally also temporally, varying tonemapping operator, and the resulting image after some further finishing is written into a video stream. In some embodiments, this processing is performed in real time on a graphics processing unit present in the device containing the camera.

21 Claims, 4 Drawing Sheets

(56) References Cited

U.S. PATENT DOCUMENTS

| | | | |
|---|---|---|---|
| 7,146,059 B1* | 12/2006 | Durand | G06T 5/007 345/617 |
| 7,193,652 B2 | 3/2007 | Hori | |
| 7,239,757 B2 | 7/2007 | Kang et al. | |
| 7,433,514 B2 | 10/2008 | Sloan | |
| 7,596,280 B2 | 9/2009 | Bilbrey et al. | |
| 7,711,200 B2 | 5/2010 | Ouzilevki et al. | |
| 7,983,496 B2 | 7/2011 | Liu | |
| 8,014,445 B2 | 9/2011 | Segall | |
| 8,068,140 B2 | 11/2011 | Helbing | |
| 8,072,507 B2 | 12/2011 | Chen et al. | |
| 8,159,579 B2 | 4/2012 | DaSilva et al. | |
| 8,237,730 B1* | 8/2012 | Anderson | G06T 15/50 345/426 |
| 8,242,426 B2 | 8/2012 | Heidrich et al. | |
| 8,290,295 B2 | 10/2012 | Criminisi et al. | |
| 8,314,847 B2 | 11/2012 | Brunner | |
| 8,340,413 B2 | 12/2012 | Cho et al. | |
| 8,358,351 B2 | 1/2013 | Brunner et al. | |
| 8,363,131 B2 | 1/2013 | Lin | |
| 8,482,698 B2 | 7/2013 | Atkins | |
| 8,606,009 B2 | 12/2013 | Sun | |
| 8,711,248 B2 | 4/2014 | Jandhyala et al. | |
| 8,831,340 B2 | 9/2014 | Paris et al. | |
| 8,958,658 B1* | 2/2015 | Lim | G06T 5/40 348/234 |
| 9,129,388 B2* | 9/2015 | Finlayson | G06T 5/009 |
| 9,378,543 B2* | 6/2016 | Aydin | G06T 5/40 |
| 9,479,695 B2* | 10/2016 | Lim | H04N 5/23229 |
| 2005/0168583 A1 | 8/2005 | Thomason | |
| 2005/0243176 A1* | 11/2005 | Wu | G06T 5/50 348/207.1 |
| 2008/0131016 A1* | 6/2008 | Kokemohr | G06T 5/009 382/254 |
| 2009/0041376 A1* | 2/2009 | Carletta | G06T 5/50 382/274 |
| 2010/0157078 A1* | 6/2010 | Atanassov | G06T 5/007 348/222.1 |
| 2010/0195901 A1* | 8/2010 | Andrus | H04N 5/213 382/162 |
| 2011/0109754 A1 | 5/2011 | Matsunaga et al. | |
| 2011/0229019 A1* | 9/2011 | Batur | H04N 5/217 382/159 |
| 2011/0243473 A1* | 10/2011 | Chen | G06T 5/007 382/274 |
| 2012/0147953 A1* | 6/2012 | El-Mahdy | H04N 19/61 375/240.03 |
| 2012/0230597 A1 | 9/2012 | Simmons et al. | |
| 2012/0237130 A1 | 9/2012 | Llach et al. | |
| 2012/0314100 A1 | 12/2012 | Frank | |
| 2013/0003086 A1 | 1/2013 | Mebane | |
| 2013/0034307 A1 | 2/2013 | Jerdev | |
| 2013/0051668 A1* | 2/2013 | Finlayson | G06T 5/009 382/168 |
| 2013/0091430 A1 | 4/2013 | Zhai | |
| 2013/0121572 A1* | 5/2013 | Paris | H04N 19/30 382/166 |
| 2013/0127894 A1* | 5/2013 | Cox | G09G 5/02 345/589 |
| 2013/0335438 A1* | 12/2013 | Ward | G06T 5/40 345/589 |
| 2014/0002694 A1* | 1/2014 | Levy | G06T 5/50 348/239 |
| 2014/0028876 A1* | 1/2014 | Mills | H04N 5/77 348/231.99 |
| 2014/0079335 A1 | 3/2014 | Sun | |
| 2014/0176750 A1* | 6/2014 | Pajak | H04N 5/225 348/222.1 |
| 2014/0241418 A1* | 8/2014 | Garbas | H04N 19/00042 375/240.02 |
| 2015/0178970 A1* | 6/2015 | Pham | G06T 5/002 382/190 |
| 2015/0201109 A1* | 7/2015 | Li | H04N 1/4074 348/222.1 |
| 2015/0245044 A1* | 8/2015 | Guo | H04N 19/177 375/240.03 |
| 2015/0348246 A1* | 12/2015 | Lim | G06T 5/001 382/167 |
| 2015/0350513 A1* | 12/2015 | Zhang | H04N 5/91 348/362 |
| 2016/0142593 A1* | 5/2016 | Boitard | G06T 5/007 348/701 |

OTHER PUBLICATIONS

T. Mitsunaga and S. K. Nayar. 'High dynamic range imaging: Spatially varying pixel exposures.' In: IEEE Conf. on Computer Vision and Pattern Recognition, vol. 1, pp. 472-479, Jun. 2000.
Bennett, Eric P., and Leonard McMillan. 'Video enhancement using per-pixel virtual exposures.' In: ACM Transactions on Graphics (TOG), vol. 24, No. 3, pp. 845-852. ACM, 2005.
Benoit, Alexandre, David Alleysson, et al. 'Spatio-temporal tone mapping operator based on a retina model.' In: Computational Color Imaging, pp. 12-22. Springer. Berlin, Heidelberg, 2009.
Chen, Min, and Guoping Qui. 'A multicurve tone mapping operator for the display of high dynamic range image and video.' In: Visual Media Production, 2007. IETCVMP. 4th European Conference on, pp. 1-7.
Chiu, Ching-Te, et al. 'Real-Time Tone-Mapping Processor with Integrated Photographic and Gradient Compression using 0.13 μm Technology on an Arm Soc Platform.' In: Journal of Signal Processing Systems 64, No. 1 (2011): 93-107.
Fairchild, Mark D., and Garrett M. Johnson. 'Image appearance modeling.' In: Electronic Imaging 2003, pp. 149-160. International Society for Optics and Photonics, 2003.
Goodnight, Nolan et al. 'Interactive time-dependent tone mapping using programmable graphics hardware.' In: EGRW '03 Proceedings of the 14th Eurographics workshop on Rendering, pp. 26-37. Eurographics Association, 2003.
Herault, Jeanny, and Barthelemy Durette. 'Modeling visual perception for image processing.' In: Computational and Ambient Intelligence, pp. 662-675. Springer. Berlin, Heidelberg, 2007.
Irawan, Pitt, et al. 'Perceptually based tone mapping of high dynamic range image streams.' In: Proceedings of the Sixteenth Eurographics conference on Rendering Techniques, pp. 231-242. Eurographics Association, 2005.
Kang, Sing Bing, et al. 'High dynamic range video.' In: ACM Transactions on Graphics (TOG), vol. 22, No. 3, pp. 319-325. ACM, 2003.
Krawczyk, Grzegorz et al. 'Perceptual effects in real-time tone mapping.' In: Proceedings of the 21st spring conference on Computer graphics, pp. 195-202. ACM, 2005.
Lee, Chul, and Chang-Su Kim. 'Gradient domain tone mapping of high dynamic range videos.' In: Image Processing, 2007. ICIP 2007. IEEE International Conference on, vol. 3, pp. 461-464. IEEE, 2007.
Meylan, Laurence et al. 'Model of retinal local adaptation for the tone mapping of color filter array images.' In: Journal of the Optical Society of America A (JOSA A), vol. 24, No. 9 (2007): 2807-16.
Pattanaik, Sumanta N et al. 'Time-dependent visual adaptation for fast realistic image display.' In: Proceedings of the 27th annual conference on Computer graphics and interactive techniques, pp. 47-54. ACM Press/Addison-Wesley Publishing Co., 2000.
Ramsey, Shaun David et al. 'Adaptive temporal tone mapping.' In: Proceedings of the 7th IASTED International Conference on Computer Graphics and Imaging, pp. 124-128. 2004.
Ritschel, Tobias et al. 'Temporal Glare: Real-Time Dynamic Simulation of the Scattering in the Human Eye.' In: Computer Graphics Forum, vol. 28, No. 2, pp. 183-192. Blackwell Publishing Ltd, 2009.
Segall, Andrew. 'Scalable coding of high dynamic range video.' In: Image Processing, 2007. ICIP 2007. IEEE International Conference on, vol. 1, pp. 1-4. IEEE, 2007.
Van Hateren, J. H. 'Encoding of high dynamic range video with a model of human cones.' In: ACM Transactions on Graphics (TOG) vol. 25, No. 4 (2006): 1380-99.

(56) References Cited

OTHER PUBLICATIONS

Wang, Hongcheng et al. 'High dynamic range video using split aperture camera.' In: IEEE 6th Workshop on Omnidirectional Vision, Camera Networks and Non-classical Cameras, Washington, DC, USA. 2005.

Youm, Seung-Jun et al. 'High dynamic range video through fusion of exposured-controlled frames.' In: Proceedings of IAPR Conference on Machine Vision Applications, pp. 546-549. 2005.

\* cited by examiner

HDR VIDEO CAMERA

RELATED APPLICATIONS

This application claims the benefit of my Provisional Patent Application 61/826,799 filed on 23 May 2013, which is hereby incorporated by reference.

FIELD OF THE INVENTION

This invention relates to the field of recording video in high dynamic range.

PRIOR ART

The following is a tabulation of some prior art patent documents that appear relevant:

| U.S. Patents | | | |
|---|---|---|---|
| Pat. No. | Kind Code | Issue Date | Patentee |
| 5,247,366 | $B_1$ | 1993 Sep. 21 | Genossar et al. |
| 5,420,635 | $B_1$ | 1995 May 30 | Inuiya et al. |
| 5,517,242 | $B_1$ | 1996 May 14 | Nakano et al. |
| 5,929,908 | $B_1$ | 1999 Jul. 27 | Ikeda et al. |
| 6,148,149 | $B_1$ | 2000 Nov. 14 | Kagle |
| 6,204,881 | $B_1$ | 2001 Mar. 20 | Ikeda et al. |
| 6,418,245 | $B_1$ | 2002 Jul. 9 | Udagawa |
| 6,496,226 | $B_2$ | 2002 Dec. 17 | Takahashi et al. |
| 6,593,970 | $B_1$ | 2003 Jul. 15 | Serizawa et al. |
| 6,670,993 | $B_1$ | 2003 Dec. 30 | Yamamoto & Yoneyama |
| 6,677,992 | $B_1$ | 2004 Jan. 13 | Matsumoto et al. |
| 6,707,492 | $B_1$ | 2004 Mar. 16 | Itani |
| 6,720,993 | $B_1$ | 2004 Apr. 13 | Hwang & Heo |
| 6,894,720 | $B_1$ | 2005 May 17 | Zhang |
| 6,952,234 | $B_2$ | 2005 Oct. 4 | Hatano |
| 6,985,185 | $B_1$ | 2006 Jan. 10 | Crawford et al. |
| 7,061,524 | $B_2$ | 2006 Jul. 13 | Gamal & Liu |
| 7,106,913 | $B_2$ | 2006 Sep. 12 | Battiato et al. |
| 7,133,069 | $B_2$ | 2006 Nov. 7 | Wallach & Koselka |
| 7,193,652 | $B_2$ | 2007 Mar. 20 | Hori & Hui |
| 7,239,757 | $B_2$ | 2007 Jul. 3 | Kang et al. |
| 7,433,514 | $B_2$ | 2008 Oct. 7 | Sloan |
| 7,983,496 | $B_2$ | 2011 Jul. 19 | Liu et al. |
| 8,068,140 | $B_2$ | 2011 Nov. 29 | Helbing |
| 8,072,507 | $B_2$ | 2011 Dec. 6 | Chen et al. |
| 8,014,445 | $B_2$ | 2011 Sep. 6 | Kerofsky & Segall |
| 8,159,579 | $B_2$ | 2012 Apr. 17 | DaSilva et al. |
| 8,242,426 | $B_2$ | 2012 Aug. 14 | Heidrich et al. |
| 8,290,295 | $B_2$ | 2012 Oct. 16 | Criminisi et al. |
| 8,314,847 | $B_2$ | 2012 Nov. 20 | Brunner |
| 8,340,413 | $B_2$ | 2012 Dec. 25 | Cho et al. |
| 8,358,351 | $B_2$ | 2013 Jan. 22 | Brunner et al. |
| 8,363,131 | $B_2$ | 2013 Jan. 29 | Lin |

| U.S. Patent Application Publications | | | |
|---|---|---|---|
| Publication Number | Kind Code | Publication Date | Applicant |
| 20,050,168,583 | $A_1$ | 2005 Aug. 4 | Thomason |
| 20,110,109,754 | $A_1$ | 2011 May 12 | Matsunaga et al. |
| 20,120,230,597 | $A_1$ | 2012 Sep. 13 | Simmons et al. |
| 20,120,237,130 | $A_1$ | 2012 Sep. 20 | Llach et al. |
| 20,120,147,953 | $A_1$ | 2012 Jun. 14 | El-Mahdy et al. |
| 20,120,314,100 | $A_1$ | 2012 Dec. 13 | Frank |
| 20,130,003,086 | $A_1$ | 2013 Jan. 3 | Mebane et al. |
| 20,130,034,307 | $A_1$ | 2013 Feb. 7 | Jerdev |
| 20,130,091,430 | $A_1$ | 2013 Apr. 11 | Zhai |

| Foreign Patents | | | |
|---|---|---|---|
| Patent Number | Kind Code | Issue Date | Patentee |
| EP 0,572,976 | $B_1$ | 1997 Apr. 9 | Canon Kabushiki Kaisha |
| EP 1,302,898 | $B_1$ | 2006 Oct. 4 | Zhang et al. |
| EP 1,500,045 | $B_1$ | 2006 Oct. 11 | Philips Electronics N.V. |
| EP 2,144,444 | $B_1$ | 2012 Jul. 27 | Banterle et al. |

| Foreign Application Publications | | | |
|---|---|---|---|
| Publication Number | Kind Code | Publication Date | Applicant |
| WO 2,011,102,887 | $A_1$ | 2011 Aug. 25 | Zhai et al. |
| EP 2,411,962 | $A_1$ | 2012 Feb. 1 | Hewlett-Packard Development Co. |
| WO 2,012,164,296 | $A_1$ | 2012 Dec. 6 | Smith |
| EP 2,533,520 | $A_2$ | 2012 Dec. 12 | Frank |

Also of interest, and referenced in U.S. Pat. No. 7,239,757, is T. Mitsunaga and S. K. Nayar. 'High dynamic range imaging: Spatially varying pixel exposures.' In *IEEE Conf. on Computer Vision and Pattern Recognition*, vol. 1, pp. 472-9, June 2000.

The field of video HDR tonemapping, especially of temporal adaptation in video HDR tonemapping, has not been treated very extensively in the patent literature. Thus, the following references to non-patent literature in this field may be helpful:

Bennett, Eric P., and Leonard McMillan. 'Video enhancement using per-pixel virtual exposures.' In *ACM Transactions on Graphics (TOG)*, vol. 24, no. 3, pp. 845-852. ACM, 2005.

Benoit, Alexandre, David Alleysson, Jeanny Herault, and Patrick Le Callet. 'Spatio-temporal tone mapping operator based on a retina model.' In *Computational Color Imaging*, pp. 12-22. Springer. Berlin, Heidelberg, 2009.

Chen, Min, and Guoping Qiu. 'A multicurve tone mapping operator for the display of high dynamic range image and video.' In Visual Media Production, 2007. *IETCVMP. 4th European Conference on*, pp. 1-7.

Chiu, Ching-Te, Tsun-Hsien Wang, Wei-Ming Ke, Chen-Yu Chuang, Jhih-Siao Huang, Wei-Su Wong, Ren-Song Tsay, and Cyuan-Jhe Wu. 'Real-Time Tone-Mapping Processor with Integrated Photographic and Gradient Compression using 0.13 µm Technology on an Arm Soc Platform.' Journal of Signal Processing Systems 64, no. 1 (2011): 93-107.

Fairchild, Mark D., and Garrett M. Johnson. 'Image appearance modeling.' In *Electronic Imaging* 2003, pp. 149-60. International Society for Optics and Photonics, 2003.

Goodnight, Nolan, Rui Wang, Cliff Woolley, and Greg Humphreys. 'Interactive time-dependent tone mapping using programmable graphics hardware.' In *EGRW '03 Proceedings of the 14th Eurographics workshop on Rendering*, pp. 26-37. Eurographics Association, 2003.

Hérault, Jeanny, and Barthélémy Durette. 'Modeling visual perception for image processing.' In *Computational and Ambient Intelligence*, pp. 662-75. Springer. Berlin, Heidelberg, 2007.

Irawan, Piti, James A. Ferwerda, and Stephen R. Marschner. 'Perceptually based tone mapping of high dynamic range image streams.' In *Proceedings of the Sixteenth Eurographics conference on Rendering Techniques*, pp. 231-42. Eurographics Association, 2005.

Kang, Sing Bing, Matthew Uyttendaele, Simon Winder, and Richard Szeliski. 'High dynamic range video.' In *ACM Transactions on Graphics (TOG)*, vol. 22, no. 3, pp. 319-25. ACM, 2003.

Krawczyk, Grzegorz, Karol Myszkowski, and Hans-Peter Seidel. 'Perceptual effects in real-time tone mapping.' In *Proceedings of the 21st spring conference on Computer graphics*, pp. 195-202. ACM, 2005.

Lee, Chul, and Chang-Su Kim. 'Gradient domain tone mapping of high dynamic range videos.' In *Image Processing, 2007. ICIP 2007. IEEE International Conference on*, vol. 3, pp. 461-4. IEEE, 2007.

Meylan, Laurence, David Alleysson, and Sabine Süsstrunk. 'Model of retinal local adaptation for the tone mapping of color filter array images.' *Journal of the Optical Society of America A (JOSA A)*, vol. 24, no. 9 (2007): 2807-16.

Pattanaik, Sumanta N., Jack Tumblin, Hector Yee, and Donald P. Greenberg. 'Time-dependent visual adaptation for fast realistic image display.' In *Proceedings of the 27th annual conference on Computer graphics and interactive techniques*, pp. 47-54. ACM Press/Addison-Wesley Publishing Co., 2000.

Ramsey, Shaun David, J. Thomas Johnson III, and Charles Hansen. 'Adaptive temporal tone mapping.' In *Proceedings of the 7th LASTED International Conference on Computer Graphics and Imaging*, pp. 124-8. 2004.

Ritschel, Tobias, Matthias Ihrke, Jeppe Revall Frisvad, Joris Coppens, Karol Myszkowski, and H-P. Seidel. 'Temporal Glare: Real-Time Dynamic Simulation of the Scattering in the Human Eye.' In *Computer Graphics Forum*, vol. 28, no. 2, pp. 183-92. Blackwell Publishing Ltd, 2009.

Segall, Andrew. 'Scalable coding of high dynamic range video.' In *Image Processing, 2007. ICIP 2007. IEEE International Conference on*, vol. 1, pp. 1-4. IEEE, 2007.

Van Hateren, J. H. 'Encoding of high dynamic range video with a model of human cones.' In ACM Transactions on Graphics (TOG) vol. 25, no. 4 (2006): 1380-99.

Wang, Hongcheng, Ramesh Raskar, and Narendra Ahuja. 'High dynamic range video using split aperture camera.' In *IEEE 6th Workshop on Omnidirectional Vision, Camera Networks and Non-classical Cameras*, Washington, D.C., USA. 2005.

Youm, Seung-Jun, W. Ho Cho, and Ki-Sang Hong. 'High dynamic range video through fusion of exposed-controlled frames.' In *Proceedings of IAPR Conference on Machine Vision Applications*, pp. 546-9. 2005.

BACKGROUND

HDR Imaging

The human eye can see very large differences between brightness levels. Within the same scene seen simultaneously, the ratio between the darkest parts of the scene that do not dissolve into pure black and the brightest parts of the scene that do not dissolve into pure white can exceed 1:10,000. One example would be looking at a person who stands with his back facing the sun. The person will emit far less light than the sky around the sun, and even though the sun itself is too bright for the human eye to see details on it, one will have no difficulty seeing, approximately simultaneously, the persons's face in the shadow and very bright clouds near the sun.

This large dynamic range has presented difficulties for photographers and filmmakers ever since the invention of these technologies since the dynamic range that can be captured by photographic film and, more recently, by electronic image sensors tends to be much less than the eye's dynamic range. As a consequence, if a scene with high dynamic range is captured on photo or video, it often happens that either parts of the scene are underexposed or parts of the scene are overexposed. In the example with the person standing with his face to the sun, a photographer or videographer could choose between having the person's face correctly exposed, but the sky overexposed and appearing as pure white, or having the sky correctly exposed, but the person's face appearing very dark or black with little detail visible. In the days before digital imaging, photographers and filmmakers would use techniques such as dodging and burning to correct these problems partially, but the process was burdensome and the results often imperfect.

In the field of still images we have seen a partial improvement of the situation with the emergence of technologies often grouped as 'HDR photography.' A typical workflow goes like this: A photographer wishing to capture a scene with a dynamic range greater than can be captured with sufficient detail with his camera sets his camera up on a tripod to keep it still over several exposures. Then he selects an exposure bracketing function on his camera that causes the camera to vary exposure by a predefined amount over successive images. He presses the shutter button repeatedly, or has an electronic control unit do so for him, and in this way obtains images of the same scene with different exposures; each part of the scene should be properly exposed in at least one of the images taken. Then the photographer can use a software package such as Photomatix® Pro, made by HDRsoft LTD of Brighton, United Kingdom, to combine these multiple exposures into a single tonemapped image. This workflow is inconvenient, but it is routinely practiced by photographers now.

The abbreviation HDR stands for 'high dynamic range,' and the abbreviation LDR stands for 'low dynamic range.' Whether a given dynamic range is considered high or low depends somewhat on circumstances and the environment one is talking about. Certainly, today the dynamic range of 8-bit color channels as they are commonly used on computer monitors and more affordable consumer cameras would be considered low, and a dynamic range corresponding to more than 16-bit resolution would be considered high. Inbetween, one typically considers a dynamic range high if it cannot be attained by the 'on-board' means of the technology in question. For example, most file formats to store motion pictures for playback on consumer devices are limited to 8 bit today, and so in this context any dynamic range higher than that would be considered high. Many digital single-lens reflex cameras can produce still images with a dynamic range corresponding to 10 bit resolution, and so this dynamic range might not be considered high in the context of recording still images with such cameras, but as of the time of this writing it would still be considered high for taking still images on smartphone and cheap consumer cameras. The term 'high-dynamic-range' or 'HDR' is also often used as a shorthand for 'low-dynamic-range image obtained by tonemapping a high-dynamic-range image.'

The exact algorithms used by software packages such as Photomatix® Pro typically are secret, but they function approximately like this: First, the several pictures of different exposure values are merged into an intermediate picture of high dynamic range. This is achieved by inferring the camera's image transfer function (the camera's mapping from amounts of light received on a pixel during the exposure to the luminance value reported by the camera for that pixel), applying the inverse of this function to the images, and then calculating for each pixel a weighted average of the luminance seen by the camera, giving more weight to the exposures that are correctly exposed for that pixel and less weight to the exposures that are not correctly exposed. In this way, one arrives at a luminance map, a good representation of the amount of light that actually hit the camera at the time the exposures were taken. This part of the process is understood fairly well in the art.

Once the HDR processing software has arrived at the luminance map, the work is not done, however. Since the luminance map is a fairly accurate representation of the actual scene's light thrown in the direction of the camera, it, too, has a high dynamic range. Unfortunately, most existing display technology can only display a fairly low dynamic range, often just eight bit corresponding to a range of 1:255 (remember that the eye can see more than 1:10,000). Thus a way is needed to compress the large dynamic range of the luminance map into a much smaller dynamic range that can be shown on an electronic screen or printed on photo paper. This process is called 'tonemapping.'

Tonemapping is as much an art as it is a science, with many approaches documented in the literature and more approaches being contained in proprietary software products without having been documented for the public. Broadly, however, there are two approaches one can take: either spatially uniform tonemapping or spatially varying tonemapping. In spatially uniform tonemapping, the value of a given pixel in the mapped image depends solely on the value of that pixel the luminance map or pixels in its immediate vicinity—the tonemapping is spatially uniform in that it considers only one or a few pixels at a time and uses the same uniform rule for all of the pixels so considered. This brings obvious advantages in processing speed. Some techniques for spatially uniform tonemapping, well-known in the art, are application of a power-law function (often called 'gamma'), application of a logarithm function, and histogram equalization, perhaps followed by improving local contrast using a 3×3 or 5×5 kernel.

Spatially uniform tonemapping has a serious deficiency, however. Consider the example we started this discussion with, a person standing with his back to the sun. Now a human would perceive the white of that person's eyes or his teeth as white and dark parts of a cloud near the sun as dark, even though objectively the dark parts of the cloud are still sending much more light into the viewer's eye than the subject's eyes or teeth. This is because humans view brightness not in absolute terms but relative to other parts of the same object. So we see the person's eyes or teeth as white because they are much brighter than the other parts of the person's face, and we see the dark parts of the cloud as dark because they are much darker than the cloud's bright parts or the sun next to the cloud. This is taken into account by spatially varying tonemapping operators that calculate the mapped brightness of a pixel not just from the pixel itself or pixels in its direct neighborhood, but also from other pixels in the target pixel's wider vicinity or even all of the image. Many different approaches are known and practiced in the art. A very simple example would be to apply an unsharp mask filter with a radius of, for example, 150 pixels to the image. An important property of this spatially varying tonemapping is that it can reduce global contrast in the image, but preserve or even enhance local contrast, which is also what the human visual system does. This approach can lead to the halo artifacts on images that one often sees on tonemapped HDR images. Better algorithms can reduce the halo effects, but to some extent they are a price one has to pay for compressing high-dynamic-range images for low-dynamic-range display.

For the purposes of this patent application we will call a tonemapping operator 'spatially varying' if the tonemapping operation performed on each pixel can be different for pixels in different parts of the image and depends upon the values of pixels not in the immediate vicinity of the pixel to be tonemapped. A common property of spatially varying tonemapping operators is that they preserve, enhance, or reduce contrast differently at different scales, or frequencies. For example, a spatially varying tonemapping operator might preserve contrast at the pixel scale, enhance contrast at a scale of 50 pixels, and reduce global contrast. By way of example, we would not consider a tonemapping operator using a single pass of a 3×3 or 5×5 kernel spatially varying, but we would consider a tonemapping operator spatially varying if that operator applies a 3×3 kernel iteratively on an image pyramid so as to obtain the effect of a sequence of kernels from the pixel scale to as large as the image itself. We would also consider a tonemapping operator that uses the Fourier transform to process different frequencies in different ways spatially varying. We would not consider an operator spatially varying if not at least some of the spatial variation is derived from the image itself; for example we would not consider an operator spatially varying that applies a different rule to pixels in the top half of the image than to the bottom half under the fixed assumption that the top half is the sky. Similarly, we would not consider a tonemapping operator spatially varying if the spatial variation is based on a human marking up certain sections of an image as opposed to computation from the image itself.

Another technique that has gotten some recognition in the art over the past few years, and that is offered by the Photomatix® Pro software package and others as an alternative option, is 'image fusion.' In image fusion, one skips the step of calculating a luminance map and obtains a tonemapped low-dynamic range image directly as a weighted average of the several original exposures, where for each pixel the original exposures are weighted according to how properly exposed they are; the better-exposed images get more weight and the worse-exposed images less. This is equivalent to first computing a luminance map and then applying a particular spatially uniform tonemapping operator. After this image fusion one may or may not apply a spatially varying tonemapping operator so as to enhance details on the image.

HDR Video

While the process to capture HDR still photographies is still burdensome but well-understood in the art, there is no such well-understood process to obtain motion pictures that capture scenes with high dynamic range and generate video footage suitable for display on electronic screens or projectors with low dynamic range.

Substantial progress has been made in prior art on one part of the equation, on the question of capturing details of a scene in high dynamic range. Perhaps the most advanced cameras on the market today that can do this are the ones made by Red.com, Inc. of Irvine, Calif. One technique employed by some of this company's cameras is taught in U.S. Pat. No. 8,159,579, which shows how to capture two images of different exposure levels near-simultaneously from the same sensor and write them to two separate video tracks. U.S. Pat. No. 6,593,970 teaches taking several exposures separately for the red, green, and blue image channels, and U.S. Pat. No. 5,247,366 teaches taking several exposures and combining them into one video frame component-wise by means of neighborhood, i. e., spatially uniform, processing.

While there has been progress on recording information from a scene with high dynamic range, there has been much less progress in turning these recordings, delivered as separate video tracks at least in the case of U.S. Pat. No. 8,159,579, into one video track that can be shown in satisfactory quality on an electronic screen of limited dynamic range. U.S. Pat. No. 5,247,366 teaches channel-wise neighborhood processing using a three-by-three kernel. U.S. Pat. Nos. 5,420,635, 5,517,242, 5,929,908, 6,418,245, 6,496,226, 6,593,970, 6,670,993, 6,707,492, 6,720,993, 6,952,234, 7,061,524 7,106,913, 7,133,069, and 8,072,507 also teach various permutations of, or equivalent to, spatially uniform tonemapping. In U.S. Pat. Nos. 6,204,881 and 6,985,185 the user has to select whether to show dark or bright parts of the picture properly exposed, which is contrary to the normal purpose of having high-dynamic-range video, and U.S. Pat. No. 7,193,652 proposes displaying different exposures side by side, which again is not how people normally want to experience a motion picture. In U.S. Pat. No. 6,677,992 even the patent's title "Imaging apparatus offering dynamic range that is expandable by weighting two image signals produced during different exposure times with two coefficients whose sum is 1 and adding them up" clearly advertises the purely spatially uniform nature of the tonemapping taught by this patent. U.S. Pat. No. 8,014,445 teaches a method of encoding a high-dynamic-range signal in such a way that it can be played back on a low-dynamic-range display with reduced detail, but that does not give us a display with proper detail either.

Perhaps the most symptomatic expression for the malaise of recording video captured from scenes of high dynamic range for playback on screens with low dynamic range can be found in U.S. Pat. No. 7,239,757. This patent actually discusses the problem of tonemapping explicitly. For a tonemapping algorithm, it refers the reader to the paper by Mitsunaga and Nayar (2000), and in this paper the authors write that it is "hard to print/display the entire dynamic range of the computed image." Thus the spatially uniform tonemapping algorithm proposed in this patent will, according to the algorithm's inventors, produce images that cannot be displayed on an ordinary screen. This might not be a problem if the video is being recorded for further postprocessing or for machine vision applications. But to this day there is no satisfactory solution that would let a user take a reasonably compact camera, or even a cellular phone he is carrying anyhow, record a scene with high dynamic range on video, and share that video without further processing on a social network such as Facebook®, run by Facebook, Inc, of Menlo Park, Calif., a very common use of video recordings today, or even just to play the recording back in satisfactory quality on the device on which it was recorded.

So far our discussion of the difficulties with existing tonemapping operators focussed on spatially varying versus spatially uniform tonemapping and found that prior art regarding video processing teaches to apply spatially uniform tonemapping.

In tonemapping video, we have a spatial dimension that we may deal with, as in still images, in a spatially uniform or spatially varying manner. Video, however, has an additional dimension that still images do not have, the dimension of time. U.S. Pat. No. 7,239,757 makes an interesting contribution with its teaching of "temporal tone mapping," which works "by essentially carrying over the statistics from frame to frame." It is important to note here that the statistics being carried over in the process taught in this patent are "global parameters" applying to the entire image and used in a spatially uniform tonemapping process.

This problem of temporal variation in tonemapping has not been treated much in the patent literature, and we will thus discuss prior art in the scholarly literature. Pattanaik et al. (2000), Kang et al. (2004), Ramsey et al. (2004), Irawan et al. (2005), Youm et al. (2005), and Van Hateren (2006) deal with temporal adaptation in the context of rendering HDR videos. Their temporal adaptation mechanism are all spatially uniform, i.e., they react to global changes in luminance.

Wang et al. (2005) make the interesting proposal of viewing a video as a three-dimensional cube (two dimensions for the image and one for time) and applying a gradient-domain tonemapping technique extended to three dimensions to this cube. This approach, if implemented, could not be trivially done live while video was being recorded since it needs to look into the future as well as into the past in the same way that tonemapping a still image needs to look left of a pixel as well as right. However, the authors "choose to attenuate only spatial gradients," thus leaving, in effect, the temporal aspect of tonemapping spatially uniform. Their method is also far too computationally intensive to apply it while recording video. For a video with a resolution of 256×256 pixels, they report that their method needs 25 seconds per frame on a desktop computer. Today computers are faster than in 2005, but we have also come to expect resolutions far higher than used in this paper. Even the camera in a cellular telephone often captures video in resolutions of 1920×1080, which is 30 times the number of pixels used in their paper. For real-time video, we need to be able to deal with about 25 frames per second, not 25 seconds per frame.

Bennett et al. (2005) have an algorithm that filters over both space and time, but their paper deals with the problem opposite of the one that we deal with—their approach accepts that the video captured by a video camera will be in low dynamic range and have quality problems, and they seek to reconstruct a more pleasant video from whatever information is left in that low-quality video stream. This is a possible approach to deal with the problem, but it would indubitably be more desirable to have a high-quality video to begin with.

The limited progress we have seen with regard to tonemapping high-dynamic range video signals has very likely to do with many proposed tonemapping operations being computationally expensive so that a sufficient speed for processing video cannot be attained easily. The algorithms, I suspect, tend to be so computationally intensive in part because the academic literature developed to a large part out of attempts to implement sophisticated biological models of the human visual system in software, not out of attempts to make a system that is practical, even if it sometimes sacrifices fidelity to what the human visual system is doing. (Note, however, that it is not obvious that a tonemapping algorithm even should attempt to replicate the human visual system precisely—what matters is the subjective quality of the tonemapped images, and it is not obvious that replicating the visual system optimizes that). In part for ease of implementation, in part because these sophisticated algorithms are not always easy to parallelize, many of the methods for tonemapping video proposed in the research literature execute on a computer's CPU, often only on a single thread.

Goodnight et al. (2003) propose doing the tonemapping on a graphics processing unit (GPU). Their algorithm uses a spatially varying tonemapping operator, but temporal variation is spatially uniform, and their method depends on a powerful graphics card in a desktop computer. Chiu et al. (2009) developed a special processor for hardware-accelerated tonemapping of still images that one could also adapt to perform the same tonemapping on video, again with spatially uniform temporal variation.

In short, all video capturing equipment known heretofore suffers from several disadvantages. Most video capturing equipment, and in particular that aimed at consumers and easily portable, does not attempt to solve the problem of high-dynamic-range recording at all. Some specialized solutions such as the cameras made by Red.com, Inc. of Irvine, Calif. are capable of capturing illumination detail from a scene in high dynamic range, but they produce several video tracks of an enormous data volume and leave it to the user somehow to turn these video tracks into one video track playable on a normal screen. This is acceptable where extensive postproduction work ('grading') is planned anyhow in professional recording settings, but it is not suitable for home use, wedding videography, and other activities where there is no desire, time, skill, or budget for substantial postproduction work. Several patents teach different methods of combining multiple exposures per video frame into one frame, but they all rely on spatially uniform tonemapping and consequently either produce video streams that cannot be displayed on normal computer or TV screens or produce video streams with very unsatisfactory local contrast. The result is, in the words of Bennett et al. (2005), that "people have long been accidentally capturing poorly exposed video with camcorders and motion-picture cameras (countless home videos of school plays and dance recitals lay testimony to this phenomenon)" with no practical solution for this problem discovered heretofore.

SUMMARY

According to some embodiments, a camera captures a plurality of images of substantially the same scene at different exposure levels for each video frame to be captured. These images are then merged or fused and processed into a tonemapped image using a spatially, and optionally also temporally, varying tonemapping operator. After some further finishing, the resulting images are written into a video stream. In some embodiments, this processing is performed in real time on a graphics processing unit present in the device containing the camera.

Advantages

Some advantages of some embodiments include:
a) It is possible to capture video of a scene exhibiting high dynamic range, with all parts of the image correctly exposed, simply by instructing the camera to record a video.
b) Writing or transmitting tonemapped video takes much less memory and bandwidth than writing or transmitting a full HDR video for later tonemapping.
c) The tonemapped output video can be displayed on ordinary video displays of low dynamic range and be recorded or transmitted in ordinary video file formats of low dynamic range without the need for later tonemapping and file format conversion.
d) It is possible to reduce global contrast but preserve local contrast, thus preserving fine details in the pictures being recorded, or even to enhance local contrast for better visibility of detail or artistic effect.
e) 'Ghosting' effects from objects moving between the several exposures in one bracket are avoided.

DETAILED DESCRIPTION

Figure 1:
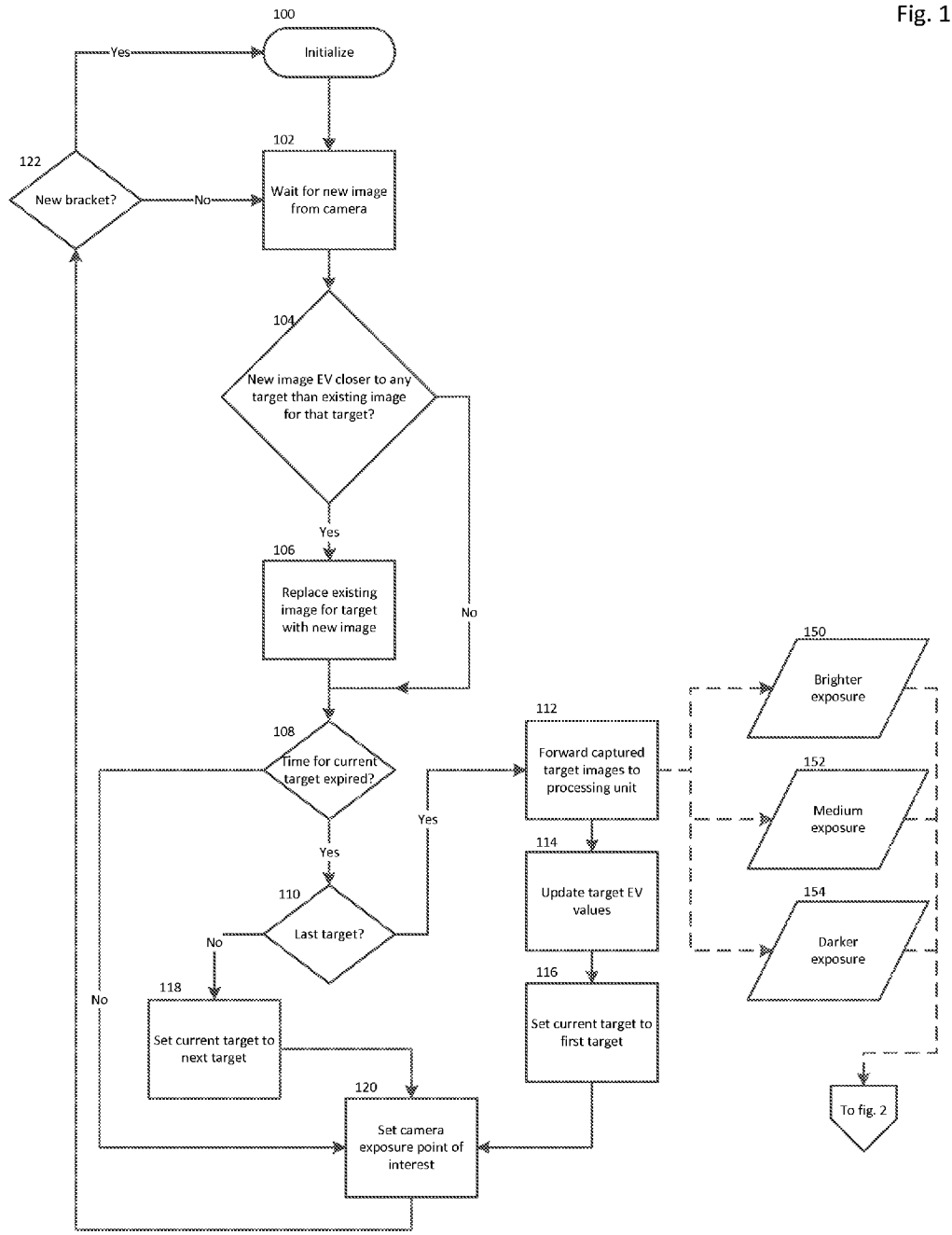
FIG. 1 shows the control flow for controlling a camera module where exposure can be set by determining an exposure point of interest so as to obtain brackets with different exposures of the same scene.
Figure 2:
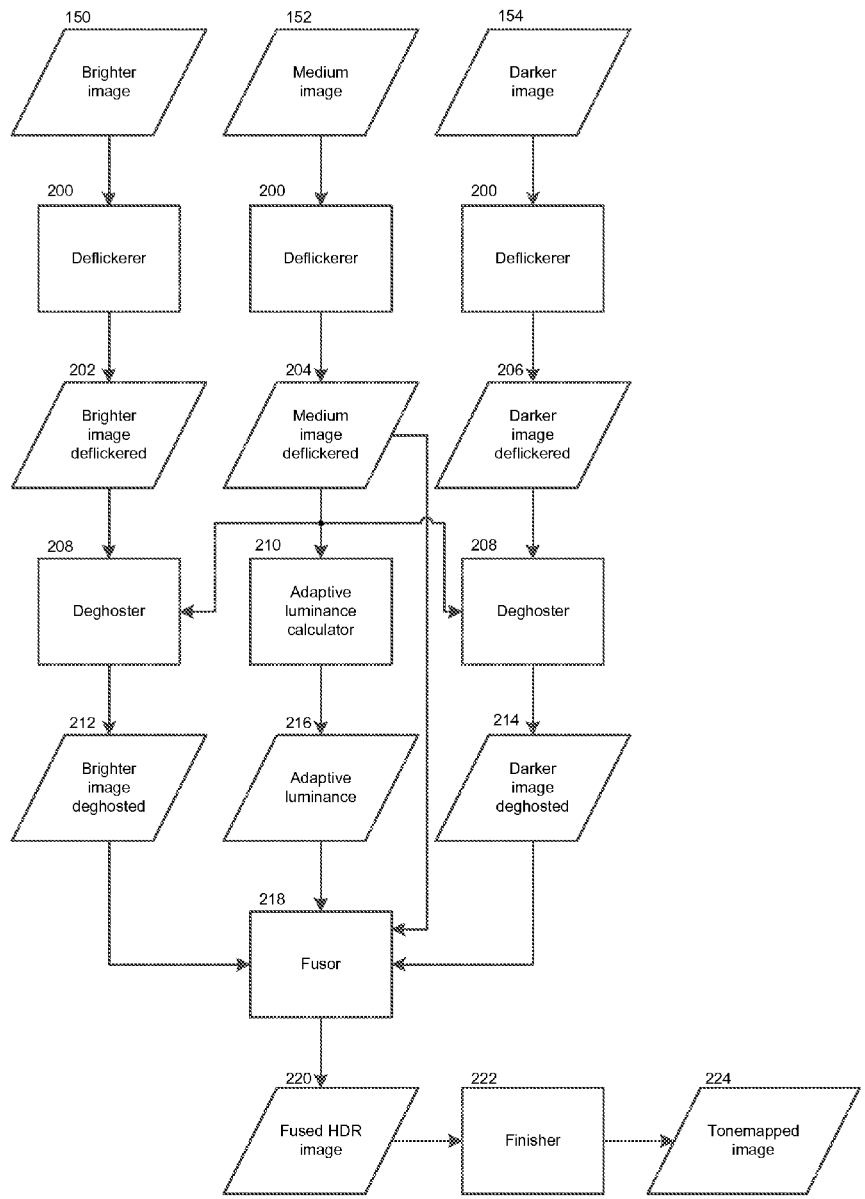
FIG. 2 shows the data flow used to fuse an exposure bracket into a tonemapped image.

FIGS. 1 and 2—First Embodiment

According to one embodiment, the invention is implemented as a high-dynamic-range time-lapse camera on the hardware platform of a smartphone such as the iPhone® 5 made by Apple Inc, of Cupertino, Calif., The smartphone is equipped with a camera, a central processing unit (CPU), random-access memory (RAM), a graphics processing unit (GPU), and storage means such as flash memory. A software program that may be downloadable by the user from a software repository such as the App Store run by Apple Inc, allows the smartphone to capture time-lapse video in high dynamic range and save the tonemapped video recording to the smartphone's storage means.

Image Acquisition

The first step in acquiring the high-dynamic range video is to obtain a plurality of exposures of substantially the same scene taken at different exposure values. Most smartphones equipped with cameras have a sensor capable of 8 bit dynamic range, corresponding to 256 different shades of each of the three primary colors red, green, and blue that the camera can differentiate in one and the same exposure. In order to be able to capture a higher dynamic range, the software program instructs the camera to capture a sequence, called a bracket, of images in rapid succession that show substantially the same scene taken at different exposure values. Exposure value might be varied by changing the camera sensor's sensitivity or changing exposure time.

Exposure value (EV) is a common measure for the sensitivity of a camera to light in a given exposure, expressed as a base-z logarithm. An increase in EV by 1 means that effectively half as much light hits the sensor with the luminance of the scene remaining the same, an increase in EV of z means a quarter as much light, and so on.

There is a problem one faces when trying to capture these exposure brackets on many smartphones as they are common on the market as of now. For example, the iPhone®'s operating system iOS®, made by Apple Inc., does not allow a user application to set a desired exposure time or sensitivity directly through its application programming interface (API). What the API allows instead is to set an 'exposure point of interest' through the property exposurePointOfInterest of objects of the class AVCaptureDevice. The software program must therefore implement a way to set exposurePointOfInterest repeatedly in such a fashion as to obtain the desired exposure brackets. FIG. 1 shows the control flow used to achieve this.

We will now discuss the control flow shown in FIG. 1 in detail. The first step 100 is to initialize the camera and storage variables for program control. There are two sub-steps to this initialization, one step performed only before the first exposure bracket is captured and one step performed before each exposure bracket is captured.

Before the first exposure bracket is captured, the steps performed include the following:
1. initialize the camera module
2. initialize three empty lists that will hold the history of previous desired exposure values as frames get recorded
3. instruct the camera to start sending the frames it is recording to the software program
4. initialize the desired exposure values for the brightest, medium, and darkest image to a value meaning 'invalid' such as the not-a-number value of floating point arithmetics or a magic number such as −1000
5. set the camera's exposure point of interest to the center of the camera's field of view.

There may also be additional steps performed such as initializing a preview of what the camera sees on the smartphone's display, operating the camera's autofocus, setting the camera's white balance point, and so on.

The steps performed at the beginning of each exposure bracket include the following:
1. record the time at which recording of this bracket began
2. initialize an empty mutable set to record all exposure values seen while recording this bracket
3. initialize three empty buffers to hold the brightest, medium, and darkest exposure of this bracket
4. set a variable for the current exposure target to a value representing 'darkest image.'

With the camera and variables thus initialized the process now moves to step 102, which simply waits for camera frames to be delivered to the software program. This may be implemented by giving a callback pointer to the smartphone's operating system, pointing to a procedure to be called whenever a new frame is recorded. All the following steps, beginning with 104, will be executed after a new frame, capturing the scene at some exposure value, has been delivered from the camera.

Once a new camera frame has been delivered, step 104 compares whether the exposure value of this new frame is closer to the desired exposure value for one or several of the desired exposure values for the brightest, medium, and darkest pictures. If so, then the buffers to hold these pictures will be replaced by the image in the current camera frame in step 106. For example, if the exposure value of the new camera frame is closer to the desired exposure value of the brightest image than the exposure value of the image currently stored in the buffer for the brightest image, then the buffer for the brightest image will be replaced by the new camera frame and the exposure value of the brightest image will be recorded as the exposure value of the new camera frame.

There are two special situations worth considering for steps 104 and 106. During the first bracket taken, immediately after recording started, the desired exposure values will be set to an invalid marker. In this case the condition of step 104 will never be met, and therefore no pictures are copied to the buffers for the brightest, medium, and darkest image at all during the first bracket. This first bracket does therefore not actually result in recorded pictures, but merely serves to initialize the desired exposure values. The other special situation is the first new camera frame delivered during the recording of a bracket that is not the first. In this case, there will be desired exposure values for the brightest, medium, and darkest pictures, but there will be no pictures stored in the corresponding buffers. Thus the condition of step 104 is always true in this special circumstance and all three buffers will be set to the picture of the new camera frame.

Step 104 also adds the exposure value of the new camera frame to the set of all exposure values seen during the current camera frame.

Moving on to step 108, this step checks whether the time allocated for the current exposure target has elapsed since the taking of the current bracket started. There are three exposure targets, representing the darkest, medium, and brightest images, respectively. In the simplest case, the software program allows one third of the total time allocated for taking one bracket to each of these three targets. The time allocated for each phase may also be distributed slightly differently; the optimal values have to be found by experimentation for a specific type of smartphone and its camera module. For example, some cameras are much faster to react to over than to underexposure. In this case, one may allocate less time for taking the darkest and more time for taking the brightest image. But taking the simplest case of equal time allocations for all three targets, the software program evaluates whether more than one third of the time allocated for each bracket has elapsed if it the current target is 'darkest image'; whether more than two thirds of the time allocated for each bracket have elapsed if the current target is 'medium image'; or whether the entire time allocated for the bracket has elapsed if the current image is 'brightest image.' If so, then the new camera frame is the last one for the current exposure target and the control flow moves on to step 110; if not, it moves directly to step 120.

Step 110, executed if the time limit for the current target has elapsed, is a control flow branch. If the current target is not the last target, i. e., if the current target is 'darkest image' or 'medium image,' the control flow moves on to step 118. Step 118 merely increments the current target; i. e., if the current target is 'darkest image' the current target will now be set to 'medium image,' and correspondingly from 'medium image' to 'brightest image.' In either case, the control flow moves on to step 120. If, however, the current target is 'brightest image' then the present new camera frame was the last one to be considered for the current bracket and control flow moves on to step 112.

Step 112, called after the last new camera frame for a given bracket has been considered, forwards the content of the three image buffers for the brightest, medium, and darkest image to the processing module of the software program that we will consider in the next section. A special case is the first bracket taken after the program has been started. Recall that at the program's initialization in step 100 the desired exposure values were set to an invalid value and thus no images were saved to the buffers for brightest, medium, and darkest image in steps 104 and 106. Thus, after the first bracket has completed there are no images saved in these buffers and consequently step 112 will not forward any images for the first bracket taken, but it will do so for all following brackets. The images 150, 152, and 154 forwarded to the processing module may be in the original format delivered by the camera or they may be converted into a different format, for example to OpenGL® ES textures. Following step 112, the control flow moves to step 114. The buffers forwarded to the image processing unit contain not only the pixel data for each buffer but also as metadata the exposure value at which each buffer was taken.

Step 114 updates the desired exposure values for the darkest, medium, and brightest images of the next bracket to be recorded. One could in principle just use the darkest and brightest exposures and some medium exposure taken during each bracket and forward these to the processing unit. This would create substantial flicker in the movie recorded, though, because as the scene changes slightly the camera might not reproduce its extreme exposure values between brackets. For example, if during one bracket an object reflects sunlight toward the camera, the exposure value of the darkest image the camera records for that bracket might increase substantially, only to fall off again in the following bracket when the object has moved slightly and no longer reflects sunlight toward the camera. This would lead to substantial flicker in the stream of images delivered to the processing unit that might be hard to correct later on.

To avoid this flickering problem and keep exposures reproducible between brackets, step 114 employs two strategies. The first strategy is to set the exposure target values for the brightest and darkest pictures in the next bracket not to the lowest and highest exposure values seen, but to the second highest and second-lowest. So the software program takes the set of all the unique exposure values seen during the bracket, sorts them, and takes the second-lowest as the new proposed desired exposure value for the brightest picture and the second-highest as the new proposed desired exposure value for the darkest picture. A special rule applies if less than four unique exposure values have been seen: in this case the highest and lowest values are taken instead of the second-highest and second-lowest. The new proposed desired exposure value for the medium image is calculated as the exposure value seen during the past bracket that is closest to the average of the new proposed desired exposure values for the brightest and for the darkest pictures.

The second strategy employed in step 114 is not to use the new proposed desired exposure values directly, but to pass them through a suitable low-pass filter. To this end, the new proposed desired exposure values are appended to the lists of histories of proposed desired exposure values for the brightest, medium, and darkest exposure values, respectively. Then the median of the last 24 entries in these histories is taken to set the desired exposure values for the three images. This method will set the desired exposure values to values that will not change erratically and for which there is a good chance that they will be seen during the next bracket. The value of 24 may be changed as desired to obtain a faster or slower reaction to changing light conditions.

After step 114, step 116 sets the current target back to 'darkest image.'

At the end of processing the new camera frame, the control flows for the various possibilities we just discussed merge again at step 120. Step 120 sets the camera exposure point of interest to the point most appropriate for the present exposure target. To this end, step 120 produces a severely scaled-down monochrome copy of the new camera image; the size of this image may be 16 pixels by 10 pixels. With the strong scaling, the intensity of each pixel on this scaled-down image corresponds to the average intensity of a fairly large region on the original camera image. The weights of the red, green, and blue channels in calculating the monochrome image may be 0.299, 0.587, and 0.114, respectively.

If the current exposure goal, as possibly updated in step 116 or 118, is 'darkest image' or 'brightest image' the software will set the camera's exposure point of interest to the location of the brightest or the darkest pixel, respectively, of the scaled-down image. If the current exposure goal is 'medium image,' the software may set the camera's exposure point of interest to the location in the middle between the darkest and brightest pixels on the scaled-down image. For the second and further new camera pictures during the medium exposure target, the software may slightly adjust the camera's exposure point of interest depending on the relationship between the exposure value of the new camera frame and the desired exposure value for the medium exposure of the bracket. If the exposure value of the new camera frame is too high, i. e., the picture is too dark, the software may move the exposure point of interest slightly toward the location of darkest pixel in the scaled-down image, and vice versa. The exact strategy used may be optimized by experimentation for a given type of smartphone and camera module, but even the basic approach described will give good results.

As a more sophisticated possibility, the software may also determine the exposure point of interest during the 'medium image' target using a Kalman filter and an optimization algorithm, strategies well-known in the art. The Kalman filter models the exposure value used by the camera as a low-pass filtered, time-dependent function of the luminance seen by the camera at the currently selected exposure point of interest. The state in this Kalman filter consists of the camera's current exposure value and the luminance at the selected exposure point of interest. An optimization algorithm, for example binary search, then evaluates the points on the line between the scaled-down image's brightest and darkest pixels and selects the point for which the Kalman filter predicts that the camera's next frame will be closest in exposure value to the desired exposure value. This method may be enhanced even more with other algorithms well-known in the art such as the particle filter, but even the basic implementation described in the paragraph above performs well on many cameras and is less computationally expensive than more sophisticated algorithms.

After the new exposure point of interest has been determined and set in step 120, the control flow moves to step 122. From there it moves to step 100 if we have just finished capturing a bracket, i. e., if we have just passed through steps 112, 114, and 116; otherwise it moves directly to step 102. When a bracket has finished, the captured images, brightest, medium, and darkest, got forwarded to the software program's processing module, which we will describe next.

Image Processing

FIG. 2 shows an outline of the data flow in the image processing module that is responsible for merging the different pictures 150, 152, and 154 of each bracket into one spatially-varying-tonemapped image. Spatially varying tonemapping is a fairly computationally intensive undertaking, even though the approach presented here is reasonably efficient with limited computation resources, and on many hardware platforms would be impractical to perform on the CPU.

Fortunately, modern hardware platforms such as smartphones, tablet computers, and, of course, dedicated cameras often contain not only a CPU but also a GPU that can perform the required tasks for many pixels in parallel. Thus, the image processing module is implemented on the GPU to achieve processing speeds that allow processing as the movie is being recorded. As a consequence, different from FIG. 1, the arrows in FIG. 2 represent data flows, not control flows. Some of the tasks may be performed in parallel at the same time. For example, the finisher 222 may work on parts of the picture already rendered by the fusor 218 while the fusor is still working on different parts of the image. Thus, the intermediate pictures represented by parallelograms in FIG. 2 need not be present in memory at the same time, or in some cases they might not need to be present as finished images in memory at any time; they are thus logical entities, not necessarily memory addresses. The processing steps represented by rectangles in FIG. 2 may be programmed in the Open GL Shading language, Apple Inc.'s Core Image Kernel Language, the CUDA C/C++ language by Nvidia Inc. of Santa Clara, Calif., or other such languages suitable to describe massively parallel processing of image data.

Deflickering

The first processing step is to deflicker the incoming images. This is useful because the camera may deliver, even with the control software outlined above, step changes in the exposure values of the three images compared to those images' exposure values in previous brackets. The deflickering filter 200 works thus: For each income image, it calculates that image's histogram. This histogram is then compared, separately for each of the three RGB color channels, with the histogram of the same exposure in the previous bracket; e. g., the histogram of the brighter image 150 is compared with the saved histogram of the brighter image 150 of the previous bracket. From this the filter computes a transfer function that, if applied to the new image, would make the new image match the old image's histogram. For example, if the previous image's median red value was 0.361 and the current image's median red value is 0.404, the transfer function would map 0.404 to 0.361.

This transfer function is then chained to the transfer function used for the same exposure in the previous bracket and attenuated. Let us walk through this process step by step. Before the first exposure, the transfer function is set to an identity function, i. e., a value of 0.5 maps to a value of 0.5. (Unless otherwise specified, we express pixel values for each color channel with 0 meaning the darkest possible value and 1 being full saturation.) Then the brighter image for the first bracket comes in. Since it is the first image, there is no previous image, and thus the transfer function remains the identity function. Let us say that this first image has a median red value of 0.43. Then the brighter image of the second bracket comes in with a median red value of 0.52, giving us an image-to-image transfer function mapping 0.52 to 0.43. Chaining this transfer function to the previous transfer function, which was identity, still gives us a transfer function mapping 0.52 to 0.43. The deflickering filter may have an attenuation constant of 0.9. This attenuation is then applied to the transfer function, giving a mapping of 0.52 to 0.52+0.9(0.43−0.52)=0.439. This mapping is then applied to the new brighter image. If the next bracket's brighter image again comes in with a median value of 0.52, the new mapping will be 0.52 to 0.52+0.9(0.439−0.52)=0.4471. The same process is applied to all color channels, all color values, not just the median, and all three images 150, 152, and 154. One can see how this process smoothes out step changes in exposure over several video frames so as to avoid flickering.

The deflickering filter may calculate and apply a new image-to-image transfer function for each new image coming in as described above. Alternatively, it may take the new image-to-image transfer function to be the identity function if the exposure value of the new image coming in is the same as the exposure value of the previous image and only calculate a new image-to-image transfer function if the exposure value changed. Both of these possibilities are workable; which one is preferable depends on the artistic effect intended on the tonemapped video when illumination changes, and the software program may allow the user to select either strategy or even a hybrid between them where the image-to-image transfer function is more strongly, but not fully, attenuated toward the identity function if the exposure value did not change between two subsequent pictures. If the camera's luminance-to-pixel-value transfer function is known in advance it is also possible not to use histograms but to compute the image-to-image transfer function directly from the camera's known luminance-to-pixel-value transfer function and the change in exposure value. This offers a speed advantage because histogram calculation can be expensive on a GPU and allows an artistic effect where changes in illumination are more strongly reflected in the tonemapped video.

Applying the attenuated cumulated transfer function described above to each of the three pictures 150, 152, and 154 gives three deflickered pictures 202, 204, and 206.

Deghosting

The next preliminary step before tonemapping proper can commence is to deghost the images. Deghosting is useful because the movement of an object in the scene between the exposures of the three images 150, 152, and 154 may cause that object to appear at different locations or in different positions on the three images. This can lead to 'ghosting' artifacts where the same image appears multiple times on the same tonemapped image. For example, there may be two slightly offset copies of the same bird flying through the scene on the tonemapped image if deghosting was not applied.

We take the deflickered medium image to be our reference image for deghosting. This image will not be deghosted, but in the other two images all parts of the image that are not compatible with the same part of the medium image will be replaced by the corresponding part of the medium image. For example, if a bird appears in different positions on all three images, the bird should remain where it is on the medium image. It should be removed from where it is in the brighter and darker images and be inserted into these images at the same position where it is in the medium image. Thus we use two instances of the deghosting filter 208. One of these instances has the deflickered brighter image 202 as its input and the deflickered medium image 204 as its reference input; the other instance has the deflickered darker image 206 as its input and the deflickered medium image 204 as its reference input.

The deghosting filter 208 works like this: For both its image input and its reference image input it calculates histograms expressed as cumulative histograms, i. e., for each possible pixel value in each channel it records what percentage of pixels in this channel is at least as bright as that value. Then for each channel for each pixel both in the input and in the reference image it calculates an interval of possible quantiles by taking the quantile value if the value of the pixel was one resolution step less and one resolution step more than it actually is. The value of a 'resolution step' is the smallest difference in value that can be represented at the camera's dynamic range, e.g., $\frac{1}{255}$ for 8-bit images. On cameras where noise exceeds the resolution of one formal resolution step, the value should be chosen higher. For example, a camera may deliver 12-bit exposure values, but noise might make only the top 10 bits meaningful; in this case a resolution step should be defined based on a 10-bit resolution.

An example: A pixel in the input image has a red value of 0.424 and the camera's dynamic range is 8 bit. The cumulative histogram for the red channel in that image shows a value of 58% for a red value of 0.420 and a value of 62% for a red value of 0.427. Thus we know that the true quantile of our pixel's red intensity must be between the 58th and the 62nd percentile. The same operation applied to the pixel in the same location in the reference image tells us that the red intensity of that pixel must be between the 24th and the 32nd percentile. The two intervals do not overlap, and thus we know that the value of the pixel in the input image is not compatible with the value of its corresponding pixel in the reference image and we need to mark this pixel as corrupted in the input image, presumably because an object moved in the time between the recording of these two pictures.

We obtain a corruption map of the input image by marking as corrupted each pixel in the input image where at least on one color channel the pixel's value is incompatible with its corresponding pixel in the reference image. This corruption map will often be rather rough and grainy and would lead to a corresponding grainy effect on the deghosted image. In order to avoid this, we smooth out and extend the corruption map. The corruption map, which can be visualized as a grey-level image of the same size as the input and reference images, has each pixel corresponding to a corrupted pixel set to a value of 1 and each pixel corresponding to a non-corrupted pixel to a value of zero. We then apply Gaussian smoothing, for efficiency decomposed into a horizontal and a vertical phase, to this corruption map. The radius of this smoothing operation may be 5 pixels.

Instead of taking just one or zero as inputs for 'corrupted' and 'non-corrupted,' the filter may also use intermediate values, reflecting how far apart the quantile intervals of the input image and the reference image are.

The deghosting filter then uses this smoothed corruption map to replace corrupted parts of the input image with corresponding parts of the reference image, adjusted in brightness to match the histogram of the input image. The deghosting filter takes the histograms of the input and of the reference image and calculates a transfer function to map each channel of the reference image to the input image. For example, if the median value for the red channel in the reference image is 0.52 and the median value for the red channel in the input image is 0.43, the transfer map will map a red value of 0.52 to a red value of 0.43. The deghosting filter then computes the deghosted image by taking for each pixel a weighted average of the pixel's value in the reference image with the transfer map applied to it and the pixel's value in the input image. The weight of the pixel from the reference image is the value of the corruption map for that pixel multiplied by a constant that may be z and clamped to values between 0.0 and 1.0, and the weight of the pixel from the input image is one minus the reference image's weight. 'Clamping' is an operation that is often available in hardware-accelerated fashion on a GPU and limits a value so as not to fall below a minimum nor to exceed a maximum value. In this way we obtain a deghosted image where the non-corrupted parts are from the input image and the parts corrupted in the input image have been replaced by the corresponding parts from the reference image with the exposure adjusted to match the input image. The medium image is already deghosted without applying any extra work because it was used as the reference image to deghost all other images.

Adaptive Luminance Calculation

Having obtained deflickered and deghosted images, a brighter one 212, a medium one 204, and a darker one 214, now the real work of spatially varying tonemapping can commence.

The human visual system, as we said in the background section above, evaluates the brightness of things it sees not in absolute terms but in terms relative to the region to which the details of an object belong. So if we see a person with his back to the sun, we still see the white of that person's eyes and his teeth as white and a dark cloud near the sun as dark, even though the dark cloud sends much more light into our eyes than the person's eyes and teeth being, as they are, in the shadow. One way to think about this is that the human visual system evaluates the brightness of things relative to an adaptive luminance of the things around and in some sense belonging to the object of which the luminance is being evaluated.

In order to implement this process in software and thus simulate the functioning of the human visual system for tonemapping our video into a form suitable for recording and playback in formats and on equipment offering limited dynamic range, we calculate an adaptive luminance map, which one can imagine as a greyscale image showing for each pixel a grey value corresponding to what would appear as 'neutral' luminance from the direction of that pixel. So in our example with the person standing with his back to the sky, the adaptive luminance map would show rather dark values for the person in the shadow and rather bright values for the sky behind him.

The first step of calculating the adaptive luminance map is to calculate the luminance of each pixel. Since the adaptive luminance does not contain that much detail anyhow, the adaptive luminance calculator 210 may consider only the deflickered medium image 204 and not the brighter and darker images. For each pixel, the luminance is calculated as a weighted average of the pixel's red, green, and blue color channels. The weights of these three channels may be 0.299, 0.587, and 0.114, respectively.

Having obtained the luminance for each pixel, a very simple way to calculate an adaptive luminance map would be to take a Gaussian blur of a grey-value image that contains each pixel's luminance. The radius of the Gaussian blur may be 25 pixels. This approach is very simple, but it leads to the halo effects prominent on low-quality tonemapped photographs, which is undesirable, except perhaps in some situations for artistic effect. An approach that gives more realistic output takes into account the variation of luminance around the pixel in questions and thus essentially the size of the object that a pixel 'belongs' to. For example, in the middle of a wide-open sky on a picture, the radius of the Gaussian blur should be rather large, but on a part of the sky near the horizon the radius of the Gaussian blur should be much smaller so as to avoid taking the lower luminance of the ground into account when calculating adaptive luminance.

The process of calculating adaptive luminance that takes these considerations into account and has much reduced halo effects compared to a simple Gaussian blur works like this: We calculate a Gaussian pyramid of the image's luminance values calculated above, i. e., a sequence of images filtered by Gaussian blur of increasing radii. Because images with higher blur radii contain less detail, they may be downsampled to save memory and processor time. Thus we now have a sequence of greyscale images, starting with the non-blurred image that we assign the index zero to up to ever more strongly blurred versions of the same image that we assign the indices 1, 2, 3, . . . to. Classically, in a Gaussian pyramid the blur radii increase and the image sizes decrease as powers of two, so the blur radii would be 1, 2, 4, 8, 16, . . . , but the progression may be faster if there is a limitation on the number of textures that can be effectively accessed by the graphics hardware used; e.g., the radii may progress as powers of three, giving blur radii of 1, 3, 9, 27, 81, . . . .

We now select the appropriate blur radius for each pixel by setting a threshold value that may be 0.1 and examining the value of the pixel in each of the series of ever-more blurred images to find the first pair of images where the absolute value of the difference between the pixel's value in the two images is larger than the threshold value. Once the absolute difference of the two pixel values exceeds the threshold value for the first time, we take the pixel's value at the first image of that pair to be the adaptive brightness value for that pixel. By way of example, for a given pixel the brightness value (expressed with 0 meaning black and 1 meaning white) may be 0.7 in the unblurred greyscale image and 0.63 in the first blurred greyscale image. The absolute difference between the two does not exceed the threshold of 0.1, so we examine the next pair. For this pair the first greyscale value is 0.63 for the first blurred image and 0.45 for the second blurred image. The absolute difference between those two values is 0.12, which exceeds the threshold value, and thus we select 0.63 as the adaptive luminance value for that pixel. The same process gets repeated for each pixel, giving us the adaptive luminance map 216. If the threshold is not exceeded even for the last image pair, then the pixel's value in the most-blurred image is taken as the adaptive luminance value. Instead of using a hard decision for either the first or the second and so on slice, the adaptive luminance calculation may also interpolate by using a value closer to the second slice of their pair if the threshold was just so exceeded and using a value closer to the first slice of the pair if the threshold was massively exceeded.

This idea may be extended even further by using a weighted average of all pyramid slices with each slice's weight depending upon the absolute differences of all slice pairs below (i. e., with less blur) the slice considered. For example, one may assign the first slice, the one with no blurring, a weight of 1. For each following slice one then assigns a weight of the previous slice's weight multiplied by 1.0/(1.0+const*absDiff) where absDiff is the absolute value of the difference of the luminance in that slice and in the previous slice, and const is a constant that may be 1.0 or may be changed to a different value for a different artistic effect. Then the adaptive luminance is taken as a weighted average of the pixel's luminance in all slices with the weights we just calculated.

Some graphics systems, including many implementations of OpenGL® ES by GPUs suitable for embedded applications such as smartphones, support only four-channel RGBA textures, not one-channel greyscale textures. In this case, one can reduce the number of textures needed in return for some increase in computational cost by having four greyscale images of different blur radii in one texture, one in each channel. So a first texture contains the unblurred greyscale image in its red channel, a greyscale image blurred with a blur radius of 1 in its green channel, a greyscale image with a blur radius of 2 in its blue channel, and a greyscale image with a blur radius of 4 in its alpha channel. A second texture is one sixteenth the size (in terms of the length of each side) of the first texture and contains the blur radii 8, 16, 32, and 64; and a third texture is 1/256 the size of the first texture and contains the blur radii 128, 256, 512, and 1024. In this way, the number of textures that need to be accessed during construction of the adaptive image map can be substantially reduced, although there is a computational cost to be paid. Whether this tradeoff is improving performance depends on the specific graphics system used and typically has to be determined by experimentation. This same approach may also be used if a chosen spatially varying tonemapping operator calls, for example, for a Laplacian pyramid to be used instead of a Gaussian pyramid.

Image Fusion

Now that we have the adaptive luminance 216 map as well as three deflickered and deghosted exposures of the same scene 212, 204, and 214, we can come to the core of the image processor's function, the fusor 216. The fusor's function is to combine these three exposures of the same scene with different exposure values into one fused image 220.

For each pixel, the fusor looks at the adaptive luminance value for that pixel and then calculates the weight given to the dark, medium, and bright exposures so that the weights sum up to one. The weight for the bright exposure may be calculated as clamp(1−2×adaptiveLuminance, 0.0, 1.0), where the clamp function, typically available as an efficient, hardware-accelerated function on GPUs, limits the result to be between one and zero. Thus for an adaptive luminance larger than or equal to 0.5, the weight of the bright exposure will be zero, for an adaptive luminance of 0.0 it will be 1.0, and between these adaptive luminance values it scales linearly. Similarly, the weight of the dark exposure may be calculated as clamp(2×adaptiveLuminance−1, 0.0, 1.0) so that for an adaptive luminance smaller than or equal to 0.5 the result will be zero and for an adaptive luminance of 1.0 the weight of the dark exposure will be 1.0. The weight of the medium exposure is then calculated as 1.0−weightDarkExposure−weightBrightExposure so that the total exposures sum to 1.0.

Having calculated the weight of the three exposures for a given pixel, the fusor converts the RGB values of that pixel in each of the three exposures into the YCrCb color system by multiplying the RGB vector for each exposure by a 3×3 matrix the values of which may be [[0.2126, −0.09991, 0.615], [0.7152, 0.33609, −0.55861], [0.0722, 0.436, −0.05639]]. This operation is done not on the integer representation used to hold the exposure in memory, but on 32-bit floating-point numbers for greater precision. Then the fusor calculates the weighted sum of the three YCrCb pixel values from the brighter, medium, and darker exposures using the weights calculated above. This gives us a value for that pixel's YCrCb value in the fused image that is the result of a spatially varying tonemapping function—if the region against which that pixel's contrast is seen by the human visual system is rather dark, most of the information will come from the bright exposure, if it is rather bright, most information will come from the dark exposure, and if it is of medium luminance most information will come from the medium exposure.

We now have a single image, encoded in the YCrCb color space, that uses the full dynamic range of all three input images. If we encoded this image with one 8-bit channel for each of the three channels, we would lose a lot of the luminance information that we just so painstakingly calculated. Thus, the fusor encodes this image using two 8-bit channels for the Y component, i. e., the luminance, and one 8-bit channel each for the Cr and Cb components encoding chrominance. The encoding may be arranged as having what would normally be the red channel hold the Cr component, what would normally be the green channel hold the higher eight bits of the Y component, what would normally be the blue channel hold the Cb component, and what would normally be the alpha channel hold the lower eight bits of the Y component. The image thus encoded with 16 bit of dynamic range in the luminance channels and 8 bit of dynamic range in each of the two color channels is then passed as the fused HDR image 220 into the finisher 222.

Image Finishing

The fused HDR image 220 contains all the information that will be contained in the final video frame to be saved to the video output, but it still can be improved by some finishing touches. Most importantly, its luminance range should be adjusted so as to make the most use of the dynamic range available in the video output. It can also be desirable to enhance local contrast further and to make some standard image adjustments such as gamma and saturation. All these steps should be done while the information from the fusor is still available in high dynamic range using two color channels to encode luminance and use 32-bit floating point math, not 8-bit integers. These tasks are the job of the finisher 222.

As a first step, the finisher may further enhance local contrast. In order to do so, it calculates an adaptive luminance map of the fused image 220, using the same method we use above to calculate an adaptive luminance map of the deflickered medium image, adjusted for luminance now being encoded in the two color channels used for the Y channel, not in RGB values. The finisher then compares for each pixel this adaptive luminance against the Y channel value of the fused image. If the absolute value of the difference exceeds a certain threshold that may be 0.02, the difference in luminance between the fused image and the adaptive luminance map will be enhanced by a factor that may be 1.5. By way of example, let the Y-channel value of a pixel in the fused image 220 be 0.45 and let the adaptive luminance of the same pixel be 0.34. The absolute value of the difference exceeds 0.02, and thus the value of the local-contrast-enhanced pixel will now become 0.45+1.5 (0.45−0.034)=0.615. The use of a threshold below which the local contrast enhancement does not take place serves to prevent the amplification of camera noise that does not represent detail in the scene captured. The factor by which local contrast is being enhanced may be changed by the user. Values of 1.2, to 1.5 tend to add more 'punch' to the image captured and point out detail whereas values larger than 2.0 tend give an artistic or even surreal effect. Of course, the user may also set a factor of 1.0, in which case performance of this operation is not necessary.

As a next step, the image should be stretched over the available dynamic range of the output. The fused image 220, with local contrast enhanced as described in the previous paragraph if so desired by the user, has a high dynamic range encoded in the two color channels used for its Y channel, but it typically doesn't make use of the entire dynamic range available, i. e., the darkest point is often substantially brighter than black and the brightest point is often substantially darker than white. Thus, the finisher calculates the histogram of the Y-channel of the fused image and then calculates an addend and a multiplicand so that if the Y-values of the image are multiplied with the multiplicand and then added to the addend, a certain number of pixels, which may be 0.05% of all pixels, have the Y-channel at pure black, and a certain number of pixels, which may be also be 0.05% of all pixels, have the Y channel fully saturated. This is a standard procedure in image processing, and for the first image in a video sequence it is being applied straight as it would be for a still image. For the following images of that sequence, however, the addend and multiplicand are low-pass filtered as an exponential moving average of all the previous addends and multiplicands in the series. So with a decay factor of 0.2, if the addend determined for the first picture was −0.1 and the addend determined for the second picture is −0.15, the addend actually used is 0.2×−0.15+ (1.0−0.2)×−0.1=−0.11. This prevents flickering in the video if bright or dark objects appear or disappear from view. These exponential-moving-average-filtered addends and multipliers are then applied to the Y channel of the locally-contrast-enhanced fused image. The number of pixels to be pure black and fully saturated may be changed by the user; a higher number will lead to more contrast in the image but have very bright and very dark details disappear in pure white and pure black, while a lower number will lead to less contrast but preserve detail better in regions of very low or very high luminance.

As a final finishing step, the finisher may perform a gamma-adjustment of the Y channel to change the image's overall appearance of brightness and darkness without actually changing the black and white points, and apply a multiplicand to the Cr and Cb values to change the image's saturation. The user may adjust the gamma and saturation values as desired. Oftentimes, users desire some saturation enhancement of high-dynamic range pictures, and the multiplier for this may be 1.3.

Now the finisher can output the finished image. For this it converts the floating-point representation of the Y, Cb, and Cr channels into the format expected by the output, such as into an 8-bit-per-channel RGB representation for output on a smartphone's display. This conversion for different output formats is well-understood in the art; by way of example, conversion to RGB can be achieved by multiplying the YCbCr vector with a matrix [[ 1.0, 1.0, 1.0], [0.0, −0.21482, 2.12798], [1.28033, −0.38059, 0.0]]. The result of this conversion then is the tonemapped image 224 that may be displayed on the device's display, stored into a video file, or transmitted as a propagated signal through an electronic data network.

Conclusion First Embodiment

The first embodiment is optimized to capture time-lapse video in high dynamic range on devices such as Apple's line of iPhone®s where a software application cannot directly control the exposure setting of the camera. This embodiment has a number of advantages, in particular the ability to capture video in high dynamic range on devices of a very small form factor that consumers own and carry with them anyhow, making it very suitable, for example, for capturing high-dynamic-range time-lapse video of a beach scene and immediately sharing that video clip on a social network. It also works on devices with rather modest graphics capabilities; for example, it has been successfully tested on Apple Inc.'s fourth-generation iPod Touch® and the iPhone® 4, which use the rather underwhelming, from today's perspective, SGX 535 GPU made by Imagination Technologies Group plc of Kings Langley, United Kingdom. On more modern hardware, such as Apple Inc.'s iPhone® 5, which uses the much more powerful SGX 543MP3 GPU, it can record spatially-varying-tonemapped time-lapse video in full 1080p resolution and above.

The first embodiment also has a number of disadvantages, though; in particular, on processors commonly installed in smart phones today it is not yet capable of capturing real-time as opposed to time-lapse video in the high-definition resolutions consumers have come to expect. It relies on the camera position with respect to the scene not changing between different exposures of one bracket, and thus requires the use of a tripod or other means to hold the camera steadily in place. This is not much of a disadvantage for time-lapse video, but for real-time video it would be very beneficial to have the ability to capture video from a camera that's being hand-held by the user. If implemented on a smartphone, the first embodiment is also limited by the image quality of the smartphone's camera; although excellent for many modern smartphones, their image quality still cannot compete with professional camera optics. The second embodiment addresses these issues in a different set of tradeoffs between unit size, cost, and speed.

Second Embodiment

The second embodiment is a real-time, spatially-and-temporally-varying-tonemapping, high-dynamic range video camera implemented on the platform of a digital single-lens-reflex camera (DSLR) or a compact camera. DSLR's offer excellent image sensors that can be much larger in size than those used by smartphones and other consumer electronics and typically offer the user the ability to change the lens used as needed for different recording scenarios. Compact cameras work much like DSLRs, but do not use a mirror to direct light away from the sensor and to the viewfinder; some compact cameras have sensors as big and of as high a resolution as DSLRs and even offer the ability to swap lenses.

The second embodiment is equipped with a microelectromechanical (MEMS) gyroscope, such as the L3G4200D made by STMicroelectronics N.V. of Geneva, Switzerland. MEMS gyroscopes are packaged like ordinary integrated circuits and allow the camera to sense changes in the direction in which it is pointing. This capability is being used for the image registration step described below. Present cameras, to the extent that they capture rotation information at all, typically use a magnetic field sensor to find camera rotation with respect to magnetic north and an acceleration sensor to decide whether the image taken should be marked as having landscape or portrait orientation. The rotation information given by these sensors is typically not precise enough for our purposes of image registration and thus we use gyroscopic sensors. The second embodiment is also equipped with an image sensor capable of capturing a reasonably large dynamic range, which may be 10 or 12 bits per color channel.

Figure 3:
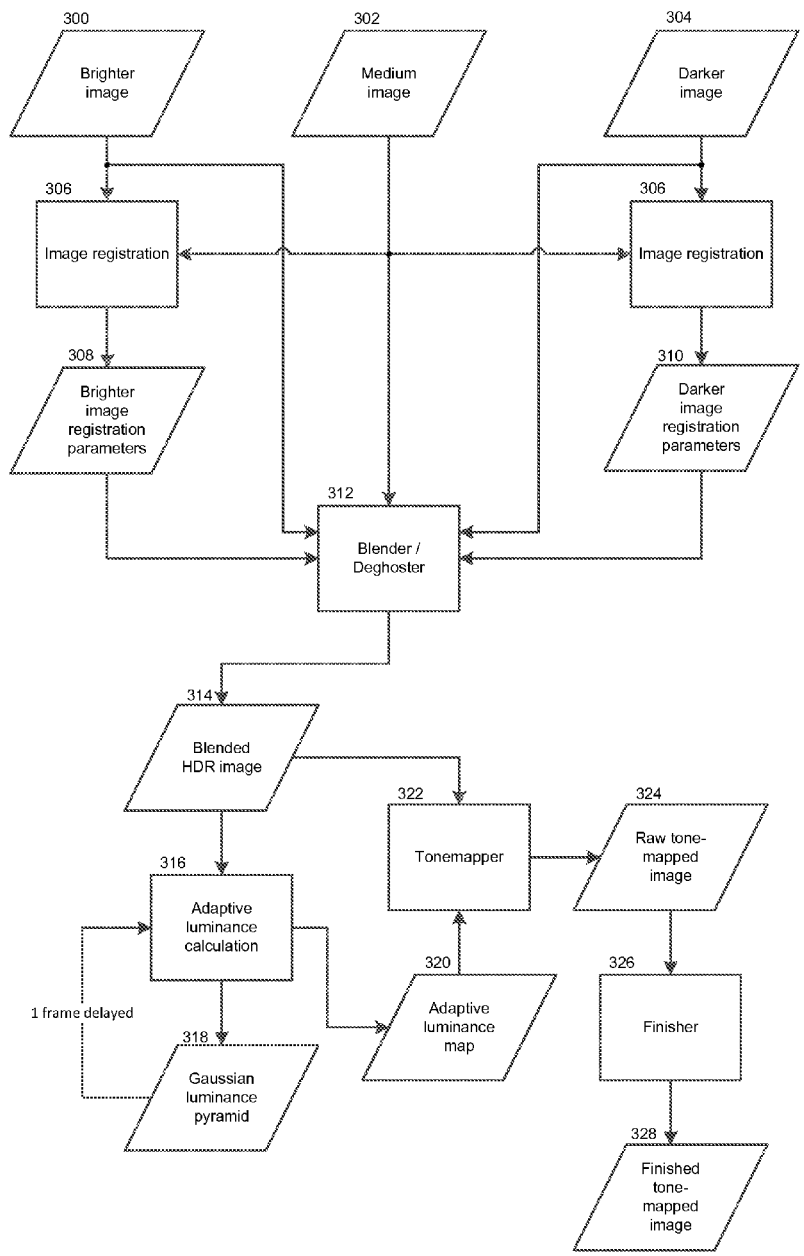
FIG. 3 shows the data flow used to merge an exposure bracket into a tonemapped image.
Figure 4:
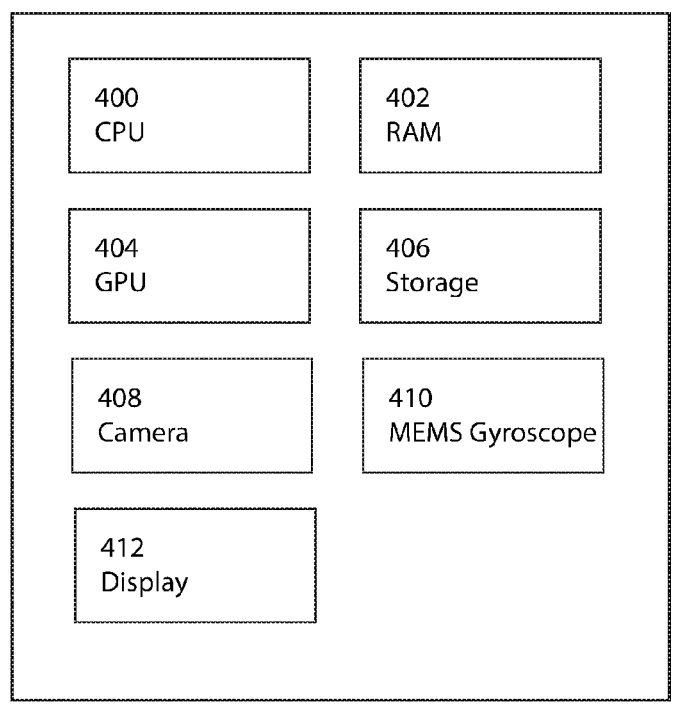
FIG. 4 shows some of the physical elements of the first and second embodiments.

The data flow of the second embodiment is shown in FIG. 3. This data flow may be implemented on a system-on-a-chip that includes a GPU capable of executing OpenGL® shaders. Alternatively it may be implemented on digital signal processor (DSP), a field-programmable gate array (FPGA), or even an application-specific integrated circuit (ASIC). All of these processor types are massively parallel processors, capable of operating on many parts of an image simultaneously. A traditional CPU, in contrast, is typically only capable of a rather limited number, such as four, processing threads being executed simultaneously. From a development perspective, the main difference between these approaches is that with FPGAs the data flow may and with ASICs it must be turned into a specific configuration of logic gates at the time the embodiment is developed, whereas with GPUs and with DSPs it is common to have shader code implementing the data flow compiled into a specific configuration of logic arrays on the processor at the time the program is running. Thus there is a tradeoff where the use of an FPGA or an ASIC can reduce unit cost and power consumption, but will make development more expensive, whereas a GPU- or DSP-based approach is very flexible and allows for low-cost development but may have higher power requirements and higher unit cost. From the perspective of the data flow and getting the tonemapped image, any of these choices of a massively parallel processor will work.

Image Acquisition

Since the camera of the second embodiment has an imaging sensor with a wider dynamic range than the smartphones and other personal devices typically used as the platform for the first embodiment, and since the camera of the second embodiment can be controlled precisely to give a specific desired exposure, the image acquisition is much simplified compared to the first embodiment and can largely use techniques already present in modern DSLRs and some compact cameras. The camera still captures a bracket of three exposures for each desired exposure, so for an HDR video of 24 frames per second, the camera will capture 24 brackets per second, totaling 72 exposures per second. This imposes an upper limit on the exposure time for each exposure, but with modern sensors this is usually not a big problem. See also the fourth embodiment for a different approach where the exposure time can be the full frame time.

For the medium exposure, the camera simply uses its normal automatic exposure function that would be used to set exposure for a normal video recording to give appropriate exposure for as many parts of the image as possible. The exposure value desired by the camera's automatic gain control is passed through a low-pass filter that may be an exponential moving average filter in order to prevent flickering. For the darker and brighter exposures, the camera may simply select a fixed exposure-value distance from the medium exposure, e. g., 2.5 exposure values less for the brighter exposure and 2.5 exposure values more for the darker exposure, giving a total dynamic range expansion of 5 exposure values. The user may be allowed to change this dynamic range expansion on a menu. The camera may also automatically change these exposure-value distances based on the dynamic range found in the scene captured so that the darkest pixels are not completely black in the brightest image and the brightest pixels are not completely saturated in the darkest image. In the case of the camera adjusting the distances automatically, a low-pass filter, which may be an exponential moving average filter, on the exposure values chosen avoids flickering. This gives for each HDR video frame to be recorded a bracket of three images, 300, 302, and 304 that are then forwarded to the image processing stage.

Each of the images 300, 302, and 304 fed into the processing stage contains not only the pixel data, but also some metadata including the image's exposure value and the direction into which the camera was pointed at the time the exposure was taken as measured by the camera's MEMS gyroscope sensors. If this direction changed substantially while the exposure was taken, the direction may be reported as 'invalid' instead. The reference point of these rotation measurements does not matter for the purposes of image alignment in the image processing stage as long as the reference point stays the same for all images within one video sequence. These same measurements, however, can also be used to include metadata with pictures taken with the camera so as to allow a user to see later in which direction he was filming. For this purpose, the axes may be defined so that pitch, yaw, and roll angles all set to zero mean that the camera is pointing at magnetic north, toward the horizon, and with the camera's bottom pointing toward the ground. If such a system of reference is desired, the camera may also to contain an accelerometer to measure gravity and a magnetic field sensor to measure the direction of magnetic north as well as means to integrate the measurements of the rotation, acceleration, and magnetic field sensors. This integration may be done by means of a Kalman filter or a particle filter, data-smoothing and integration algorithms well-known in the art.

Image Processing

Having described the image acquisition process for the second embodiment, we now return to FIG. 3 and the data flow for the image processing. Image processing starts with the three differently exposed images of the same scene 300, 302, and 304 that include both pixel data for each image and as metadata each image's exposure value and the direction in which the camera was pointing.

Image Registration

The first step is the image registration 306. Analogously to the approach taken in the deghoster of the first embodiment, we take the medium exposure 302 as the canonical one that is by definition registered correctly, and the task now is to align the brighter exposure 300 and the darker exposure 304 with that medium exposure. In our discussion of the image registration, we will call the brighter or darker image the 'input image' and the medium image the 'reference image.'

The starting point for the image registration are the rotational measurements contained in the image's metadata. We compare the pitch, yaw, and roll angles of the image to be registered with the corresponding angles of the medium exposure used as a reference image and calculate the amount of rotation in each axis that took place between the two exposures. This is well-understood in the art and may be achieved by expressing the rotations as unit quarternions.

With the camera's rotation between the two exposures known and the approximate focal width of the lens used also known, we can now translate the camera's rotation into shifts of the input image (the one to be registered) by the x- and y-axes and a rotation of the image around the image's center that brings the pixels of the input image into alignment with the reference image. This alignment may not be precise, however, and to correct this, an image registration algorithm refines these three parameters so as to get the best-aligned images possible. Since we already have a fairly close approximation of the correct value, this may be done by a gradient search seeking to maximize the rank correlation of pixel values in the input image with pixel values in the reference image. It is sufficient to evaluate a small subset of pixels for this purpose. This gradient search may be performed iteratively for the slices of a Gaussian image pyramid—i. e., first we seek the optimal registration for downscaled blurred images, then for less downscaled and less blurred images, and finally for the actual images without blurring applied. It is also possible to use more sophisticated registration algorithms, of which many are known in the art, but this typically comes at an increased computational cost and thus increased power consumption.

In an implementation that is constrained by computational capacity, the rotation between the images calculated from the sensor measurements may be also used directly, without further algorithmic image registration, if the focal width of the lens used is known precisely, either because it is fixed (a 'prime lens') or because there is a precise measurement of the focal length available in a zoom lens.

Alternatively, it is also possible to build the second embodiment without the rotation sensors and use a more sophisticated algorithm to achieve image registration by software alone without using sensor data about camera rotation. This may be achieved by performing a grid search followed by a gradient search to obtain the optimal image registration parameters, or by another of the methods for image registration known in the art such as by using feature recognition and matching.

If the camera has been rotated so much between the two exposures that is not possible to obtain properly registered images by the operations of shifting in the x- and y-axes and rotating around the image's center point, the rotation is marked as 'invalid.' Alternatively, one may use more sophisticated image registration methods, a process known in the art particularly from the problem of stitching panorama images, but this is computationally expensive and the results usually do not justify the extra computational expense and the consequent power consumption. If the input image's rotation or the reference image's rotation has been marked as 'invalid' in the image acquisition stage because the camera rotated a substantial amount while the image was being acquired, the rotation is also marked 'invalid.'

The image rotation parameters for both the brighter and the darker image, 308 and 310, comprising shifts in the x- and y-axes and rotation around the center, or an 'invalid' mark, are then forwarded to the blender/deghoster 312.

Blender/Deghoster

The blender/deghoster 312 (henceforth just 'blender') takes the three input images 300, 302, and 304 as well as the image rotation parameters for the brighter and darker images, 308 and 310, and uses them to construct a high-dynamic-range image from all three exposures; deghosting is performed in the same work step.

To perform the blending and deghosting operation, the blender retrieves each pixel of the medium exposure. For each pixel in the medium exposure 302, the blender also retrieves the corresponding pixels from the brighter and darker images 300 and 304, using trigonometric transformations or linear algebra to take the image registration parameters into account. Since the brighter and darker images may be shifted or rotated compared to the medium image, it is possible that there is no corresponding pixel in the brighter or darker images. There is also no corresponding pixel in the brighter or darker images if one of the corresponding rotations has been set to 'invalid.' The blender notes this by setting the alpha channel of such pixels that could not be retrieved to zero; for pixels that could be retrieved, the alpha channel is set to one. In order to optimize image quality, the blender may use interpolation between adjacent pixels when retrieving pixel data from the brighter and darker images.

The blender then uses the image sensor's known image transfer function (mapping amount of light received by the sensor to pixel values) to calculate the illuminance of each pixel in each color channel. The scale used to do so is arbitrary. For example, the blender may compute from each pixel's value and the image's exposure value what the pixel's value would have been had the exposure parameters been f/16, $1/100$ sec, and ISO 100; we will call this the exposure-value-adjusted pixel value. It is encoded in 32-bit floating-point numbers.

The blender calculates not just one value for each pixel from each image, however, but two: an upper and a lower limit. The upper limit is what the exposure-value-adjusted pixel value would have been had the pixel value been higher by the smallest step the sensor can measure, i. e., if the sensor's readout for that pixel and channel had been one more when it was expressed as an integer value; if the channel has reached its saturation value then the upper limit is infinity. The lower limit is calculated conversely as the exposure-value-adjusted pixel value if the sensor's readout for that pixel and channel had been one step lower, or zero if the sensor reading for that pixel and channel was already zero.

Instead of using a width corresponding to an increment of one in the sensor reading, one may use a slightly larger interval to take sensor noise into account. For example, even though the sensor is 12-bit, one may use intervals that are $1/1024$ the width of the sensor's nominal dynamic range. This will avoid having data discarded by the deghoster due to sensor noise. The optimal value has to be found for each implementation by some experimentation.

Thus for each pixel and color channel the blender now has intervals from all three exposure channels (except the ones for which no valid value was found) corresponding to the maximal and minimal amounts of light the sensor must have received during the exposure for that pixel and channel. These intervals will be wider for underexposed pixels, narrower for properly exposed pixels, and of infinite width (but with a known lower limit) for pixels so overexposed that the sensor was saturated.

In order to perform the deghosting operation, the blender throws out intervals from the brighter and the darker exposure if these intervals do not overlap with the interval for the medium exposure.

The blender now takes from the remaining intervals for each pixel and channel the lowest upper limit and the highest lower limit to determine a narrower interval for the that pixel and channel, and the mean of that new upper and lower limit is taken as the blended sensor reading for that pixel and channel.

We now have a high-dynamic-range, deghosted image taking into account observations from all three exposures, that is, however, not yet, tonemapped. Finally, in order to facilitate tonemapping the blender converts the RGB pixel values into the YCrCb color space. As in the first embodiment, on a graphics system that naturally uses four color channels the YCrCb pixels may be encoded using two channels to encode the Y component in high resolution and one channel each for the Cr and Cb components. This HDR picture 314 is then passed to the tonemapping process. Alternatively, if the user desires to preserve information for later tonemapping, the HDR picture may be written out to a video file on the camera's storage medium using a video format capable of recording high-dynamic range video.
Tonemapper/Finisher The tonemapping/finishing process starts with the blended HDR image 314 and applies a spatially and temporally varying tonemapping operation to it. To this end, filter 316 calculates the adaptive brightness for each pixel in the blended HDR image. Analogously to the technique used in the first embodiment, the filter calculates a Gaussian pyramid of luminance values at different blur levels. If this is done without taking the previous adaptive brightness map into account, we obtain a luminance map that is spatially, but not temporally varying. The human visual system, however, has not only spatial but also temporal adaptation. To imitate this aspect of the human visual system, if a part of scene was bright in the previous video frames, its adaptation value should be fairly bright, even if the part of the scene got darker suddenly and thus is fairly dark in the current frame. For example, when we see a flashing light go on and off, our visual system enhances the contrast between the darkness of the light being off and the brightness of it being on. This is taken into account by temporal as well as spatial adaptation.

For the purposes of this patent application, we call a tonemapping operation spatially and temporally varying if it is spatially varying as defined above and additionally the tonemapping operator also varies depending upon the value of at least one spatially varying parameter in previous video frames. So we would call, for example, a tonemapping operator spatially and temporally varying if that tonemapping operator used an adaptive brightness that for each pixel was an exponential moving average of a large-radius unsharp mask value for that pixel's luminance. On the other hand we would not call an operator spatially and temporally varying if it was spatially varying but the only thing that preserved information over time was a global parameter like brightness or gamma. We would also not call an operator spatially and temporally varying if the spatial and temporal variation was based on a human marking up spatial and/or temporal segments and not on computation from the images themselves. Specifically, we do not call a tonemapping operation spatially and temporally varying if the temporal variation is not also spatially varying. For example, the first embodiment uses a spatially varying tonemapping operator, and the stretching of luminance in the finisher also introduces a temporal adaptation; but the temporal adaptation is global only and not spatially varying; thus, the first embodiment uses a spatially-varying, but not a spatially and temporally varying tonemapping operator. According to this definition, every spatially and temporally varying tonemapping operator is also a spatially varying tonemapping operator, but not every spatially varying tonemapping operator is also a spatially and temporally varying one.

Filter 316 is spatially and temporally varying by calculating for each video frame of the blended HDR image 314 a Gaussian image pyramid of the image's luminance and then calculating (except for the first video frame where there is no previous video frame) for each image contained in that pyramid an exponential moving average for each pixel. By way of example, if the luminance value of a given pixel for the third-largest slice in the Gaussian pyramid was 0.7, the value of the same pixel in the previous luminance pyramid 318 was 0.6, and a decay factor was 0.1 for that slice, then the temporally adapted value for that slice would be (1−0.1)×0.6+0.1×0.7=0.61. The Gaussian pyramid so temporally adapted is then stored as the luminance pyramid 318 and used again as an input for the filter 316 for the next video frame of the blended HDR image 314 coming in.

The decay factors for the different slices of the Gaussian pyramid may be different, and they may depend on the size of the change in illuminance. If changes in luminance are not enormous, typically the human visual system attenuates changes over time on wide spatial scales and emphasizes them on smaller spatial scales. For example, if a cloud moves over a sunlit scene that we are watching, we certainly perceive a reduction in brightness, but we perceive the reduction in brightness to be much less dramatic than it actually is. However, changes of luminance on small spatial scales, for example blinking lights, tend to draw our attention and we perceive these changes to be stronger than they actually are. Thus, one may want a lower decay factor for smaller spatial scales, i. e., slices of the pyramid with less blurring, and a larger decay factor for larger spatial scales, i. e., slices of the pyramid with more blurring. Having a larger decay factor for smaller spatial scales also increases the chance that in a part of the image that has motion or small-scale changes in luminance the absolute value for the absolute difference between the pixel's luminance and a less-blurred pyramid slice will exceed the threshold value, and thus the adaptive luminance map will more likely rely on information from a more-blurred slice, which can reduce flickering.

When the previous luminance pyramid 318 gets reused for a new video frame, the adaptive brightness calculation filter 316 may shift and scale it to compensate for camera rotation between the medium image 302 that went into the current frame and the medium image 302 that went into the previous frame (or another input image if another image than the medium image was chosen as the reference image for the deghosting operation). In this case, due to camera rotation no previous adaptive luminance value may be available for some pixels. If so, the adaptive luminance calculation for these pixels gives no weight to the unknown previous luminance and all weight to the new luminance, i. e., it operates as it would on the first video frame of a sequence being recorded. The method used to compensate for camera rotation may be the same as described above for the registration of the three input images, i. e., starting with rotation sensor value and then refining the rotation estimate using gradient searches over a Gaussian image pyramid, starting with the most blurred and progressing to the least blurred slice. If the rotation between the current and the previous bracket exceeds a certain threshold, we throw out the previous image pyramid and proceed as if the present bracket was the first in the sequence.

From the temporally adapted Gaussian luminance pyramid, the adaptive luminance calculation filter 316 then calculates the adaptive brightness for each pixel in the same way described in the first embodiment, i. e., it iterates through all consecutive pairs of slices and takes the luminance value of the less-blurred image of the first pair where the difference between the luminance values of the two pairs exceeds a certain threshold.

The tonemapper 322 takes the adaptive luminance map 320 that we just calculated and the blended HDR image 314. Then for each pixel in the blended HDR image it enhances the difference in the luminance, i. e., the Y-channel, between that pixel and the adaptive luminance map by a certain factor that may be 1.4. By way of example, if a pixel's Y-channel in the blended HDR image 314 is 0.6, the value of the corresponding pixel in the adaptive luminance map is 0.5, and the enhancement factor is 1.4, the pixel's new luminance would be 0.5+1.4(0.6−0.5)=0.64. Applying this rule to all pixels of the blended HDR image 314 gives the raw tonemapped image 324, with the chrominance values unchanged from the original blended HDR image. The luminance values of this raw tonemapped image may fall below 0 and exceed 1; thus they are encoded in a high-dynamic-range format. This may be done by using two color channels to encode the Y-channel and one color channel each for the Cr and Cb channels as described in the discussion of the first embodiment.

The finisher 326 then calculates, analogously to the discussion in the first embodiment, a multiplier and an addend to stretch the raw tonemapped image 324 over the available dynamic range, i. e., to bring its luminance values between 0 and 1, applies low-pass filters to these numbers, applies the multiplier and addend, applies gamma and saturation correction, and outputs the image in a desired target format. This gives the finished tonemapped image 328 that can be displayed, recorded in a video stream, or transmitted.

Third Embodiment

The third embodiment is a security camera in a small case meant for installation in stores, commercial parking lots, transit stops, or private residences, or even a backup camera for a car or truck. For this application artistic quality of the images delivered by the camera matters less than in the first two embodiments, but capturing detail over a high dynamic range and transmitting and/or displaying it on low-dynamic range equipment are just as important. For example, in a parking lot at night with artificial illumination it is desirable to be able to see both the parts of the lot directly under a light as well as the parts in the shadow.

The third embodiment uses the image acquisition method of the second embodiment, i. e., it captures two images at a fixed exposure-value interval around a medium exposure where the exposure value of the medium exposure is set by a conventional automatic exposure mechanism. It omits, however, the measurement and encoding of angular data about the camera's rotation since security cameras are typically not used as hand-held cameras. Then the third embodiment uses the image merging method of the second embodiment, but without the compensation for camera rotation and without the time-varying aspect of the tone-mapping, to calculate a spatially-varying-tonemapped image which may then be displayed on a monitor or recorded.

Fourth Embodiment

Over the past years, we have seen the development of image sensors for portable cameras with higher dynamic ranges than were possible in the past. Whereas most high-quality cameras such as DSLRs achieve a dynamic range of about 11 EV units, the image sensors in the D800E camera, made by Nikon Corporation of Tokyo, Japan, and the Cyber-shot™ DSC-RX1, made by Sony Corporation of Tokyo, Japan, achieve a dynamic range of more than 14 EV units. Use of such a sensor makes a fourth embodiment possible.

In this embodiment, we only capture one video frame per video frame to be written to the output, with the automatic gain control set so as to minimize the number of pixels being fully saturated or fully black. For each frame captured by the camera, we convert this frame to the YCrCb color space, take it directly as the blended HDR image 314 of FIG. 3, and then continue processing as described in the second embodiment. Whereas without this processing the camera sensor's excellent dynamic range would get lost when the video is being written out to storage, our application of a spatially and temporally varying tonemapping operator allows us to preserve much more of the detail captured by the sensor and to write out a video stream that is still at a manageable bit rate, in a commonly understood video format, and directly playable on displays of a low dynamic range.

This embodiment does not need the rotational sensors of the second embodiment for purposes of image registration and deghosting. It may still use the rotational sensors, however, for registration of the previous frame's Gaussian luminance pyramid 318 in the filter 316 as described in the second embodiment.

If a scene's dynamic range exceeds even the rather large dynamic range of the sensor used in the fourth embodiment, the camera may automatically or based on a user setting fall back to the recording method of the second embodiment using more than one sensor exposure for each video frame to be written to the output.

CONCLUSION, RAMIFICATIONS, AND SCOPE

Over the four embodiments discussed we saw a progression of different tradeoffs to implement capturing video in high dynamic range and tonemapping it. In the first embodiment, we had to spend much work on just capturing images at a high dynamic range from a camera that gives only 8 bit depth and needs to be controlled by manipulating an exposure point of interest. In return we get an embodiment that allows consumers to capture high-dynamic-range videos using nothing but a ubiquitous cellular telephone and an application running on that telephone that may cost only a few dollars. In the second embodiment we used a more advanced sensor that is, however, also more expensive and physically larger, to capture tonemapped video on a camera that at the time of this writing can be sold for a few hundred to a few thousand dollars, depending upon optical quality and other desired features. This camera can capture and save temporally-and-spatially-varying-tonemapped video in real time at resolutions as large as can be displayed by high-quality TV sets and computer monitors. In the fourth embodiment, we used an even better and more expensive sensor and this allows us to simplify that image capture process even more than we did from the first to the second embodiment. Deghosting became unnecessary as we only need to capture one video frame for each frame written. Of course, the cost for this camera is also higher and as of this writing exceeds two thousand dollars for a consumer or semiprofessional unit, but this is still a large savings over current specialized cameras, and the user immediately gets a tonemapped video instead of having to generate enormous amounts of data for several video tracks that have to be merged and tonemapped later on specialized computer hardware.

The tradeoffs we have seen in the four embodiments discussed all have their applications, from a consumer device that can be implemented by downloading an application to a smartphone the consumer owns anyhow for a few dollars to a rather professional but still affordable camera capturing video of scenes with a high dynamic range in a very good quality. If I could select only one embodiment to use for all of my video needs, at the present time it would be the second embodiment because it combines affordability with functionality in a tradeoff that appears favorable at this time.

Accordingly, the reader will see that the video camera of the various embodiments can be used to capture scenes exhibiting a large dynamic range and process them into a form that can be transmitted, stored, and displayed in formats and on hardware of a low dynamic range. Some advantages of some embodiments include:
a) Use of a spatially varying tonemapping operator preserves or even enhances local contrast while reducing global contrast.
b) Use of a spatially and temporally varying tonemapping operator preserves or even enhances local contrast as well as changes in luminance over time and simulates the human eye's response to changes in luminance.
c) Application of the tonemapping operator in the recording apparatus while the recording is being done creates a signal that needs much less storage space or bandwidth than a HDR video signal to be tonemapped later.
d) Application of the tonemapping operator in the recording apparatus while the recording is being done gives the user a video ready to be shared or displayed immediately after the recording is finished.
e) Application of the tonemapping operator in a common piece of recording hardware, such as a smartphone or a DSLR camera, simplifies the recording process. Whereas previously recording HDR video would entail first recording several video tracks on special hardware and then tonemapping them on a separate computer with specialized software, now recording spatially and temporally varying tonemapped HDR video is as simple as pushing a record button on a common camera.
f) Use of massively parallel processing speeds up image processing and reduces power consumption on portable devices compared to image processing on a CPU.
g) Passing desired exposure values through a low-pass filter reduces flickering on the recorded video.
h) Deflickering incoming video frames reduces flickering on the recorded video.
i) Deghosting reduces or eliminates ghost effects on the recorded video.
j) Using multiple color channels to contain HDR luminance information allows the use of cheap and energy-efficient 8-bit graphics processors to process and tonemap images at a dynamic range of more than 8 bit.
k) Storage of four slices of a monochrome Gaussian image pyramid in the color channels of a single RGBA texture allows spatially varying tonemapping on a graphics processing unit that allows only a small number of textures to be used simultaneously.
l) Saving pitch, yaw, and roll information with recorded images allows these images to be registered more easily than attempting image registration merely from the images themselves. This particularly beneficial if the scene contains multiple instances of very similar-looking elements as is common in architectural scenes.

Although the description above contains many specificities, these should not be construed as limiting the scope of the embodiments but as merely providing illustrations of some of several embodiments. For example, different image acquisition and tonemapping algorithms may be used or the depth of the color channels of the camera and graphics processors may be different than in the descriptions above, etc. As another example, the tradeoffs in the first and second embodiments have been chosen so as to have a time-lapse camera on a smartphone in the first embodiment and a real-time camera on a DSLR camera in the second embodiment. With different tradeoffs regarding resolution, processing quality, and power consumption, it is equally possible to build a real-time camera on a smartphone platform and a time-lapse camera on a DSLR camera platform.

Similarly, in the first three embodiments, I have shown three exposures at different exposure values captured for each video frame to be written. This number may be changed to any number larger than one, such as two, four, or five, with an increase in computational cost and time needed for video capture as the number increases. It may, in fact, even be one, which gives the fourth embodiment. It is also possible to recycle captured frames for several video frames to be written. For example, in the second embodiment, the camera may write a new video frame after each exposure has been captured, combining the new exposure with the two most recent exposures for the other exposure values.

Thus the scope of the embodiments should be determined by the appended claims and their legal equivalents rather than by the examples given.

I claim:
1. A video camera comprising an image sensor, electronic memory, and at least one processor, said camera being adapted to capture a sequence of input images from said sensor and to apply a spatially varying tonemapping operator to said input images, resulting in a sequence of tonemapped images,
    said spatially varying tonemapping operator being characterized by operating differently on pixels in different regions of said input images, where the difference in the operation of said operator for different pixels within the same input image depends at least for some pixels at least in part on the value of at least one pixel with a distance of at least 24 pixels from the pixel on which said tonemapping operator is operating, and
    said spatially varying tonemapping operator being further characterized by generating, during the processing of said input images, at least one intermediate image stored in said electronic memory, the values of the pixels of said intermediate image depending at least in part on the values of the pixels in the input image currently being processed, and referencing said inter- mediate image as an input for generating the output image currently being generated.

2. The video camera of claim 1 where said tonemapped images are output at a lower dynamic range than the dynamic range of said input images captured at a higher dynamic range.

3. The video camera of claim 1 where said camera is adapted to control said image sensor so as to capture each of said input images at a higher dynamic range by capturing a plurality of images at a lower dynamic range and combining said pluralities of images at a lower dynamic range into said input images at a higher dynamic range.

4. The video camera of claim 1 where at least one of said processors is a massively parallel processor.

5. The video camera of claim 1 where at least one of said processors is a GPU.

6. The video camera of claim 1 where said spatially varying tonemapping operator is a spatially and temporally varying tonemapping operator,
said tonemapping operator being characterized by taking into account, additionally, input comprising the values of pixels in preceding video frames in said sequence of input images.

7. The video camera of claim 1 where for a given pixel in one of said tonemapped images different weights are given to other pixels in said input image in the application of said spatially varying tonemapping operator, said weights depending at least in part on the values of said other pixels.

8. The video camera of claim 1 where the operation of said operator for different pixels within the same input image depends at least for some pixels at least in part on the value of at least 2,499 other pixels.

9. The video camera of claim 1 where said camera captures exactly one exposure from said image sensor as an input image for each of said tonemapped images to be generated.

10. A method for processing video comprising
receiving a sequence of input images and
applying a spatially and temporally varying tonemapping operator to said images with a massively parallel processor, resulting in a sequence of tonemapped images, said spatially and temporally varying tonemapping operator being characterized by operating differently on pixels in different regions of said input images, where the difference in the operation of said operator for different pixels within the same input image depends at least for some pixels at least in part on the value of at least one pixel with a distance of at least 24 pixels from the pixel on which said tonemapping operator is operating as well as on at least one pixel from an input image of a preceding video frame, and said spatially varying tonemapping operator being further characterized by
generating, during the processing of said input images, at least one intermediate image stored in electronic memory, the values of the pixels of said intermediate image depending at least in part on the values of the pixels in the input image currently being processed, and referencing said intermediate image as an input for generating the output image currently being generated.

11. The method of claim 10 where said tonemapped images are output at a lower dynamic range than the dynamic range of said input images.

12. The method of claim 10 where the operation of said operator for different pixels within the same input image depends at least for some pixels at least in part on the value of at least 2,499 other pixels.

13. A method, comprising receiving a sequence of input images from an image sensor as such images are being recorded and applying by at least one electronic processor a spatially varying tonemapping operator to said input images, resulting in a sequence of tonemapped images,
said spatially varying tonemapping operator being characterized by operating differently on pixels in different regions of said input images, where the difference in the operation of said operator for different pixels within the same input image depends at least for some pixels at least in part on the value of at least one pixel with a distance of at least 24 pixels from the pixel on which said tonemapping operator is operating, and said spatially varying tonemapping operator being further characterized by generating, during the processing of said input images, at least one intermediate image stored in electronic memory, the values of the pixels of said intermediate image depending at least in part on the values of the pixels in the input image currently being processed, and referencing said intermediate image as an input for generating the output image currently being generated.

14. The method of claim 13 where said tonemapped images are output at a lower dynamic range than the dynamic range of said input images captured at a higher dynamic range.

15. The method of claim 13 further comprising receiving a plurality of input images captured at a lower dynamic range and combining said plurality of input images into images of a higher dynamic range.

16. The method of claim 13 where at least one of said processors is a massively parallel processor.

17. The method of claim 13 where at least one of said processors is a GPU.

18. The method of claim 13 where said spatially varying tonemapping operator is a spatially and temporally varying tonemapping operator,
said tonemapping operator being characterized by taking into account, additionally, input comprising the values of pixels in preceding video frames in said sequence of input images.

19. The method of claim 13 where for a given pixel in one of said tonemapped images different weights are given to other pixels in said input image in the application of said spatially varying tonemapping operator, said weights depending at least in part on the values of said other pixels.

20. The method of claim 13 where only one exposure from said image sensor is being received for each of said tonemapped images to be generated.

21. The method of claim 13 where the operation of said operator for different pixels within the same input image depends at least for some pixels at least in part on the value of at least 2,499 other pixels.

* * * * *